(12) United States Patent
Ji et al.

(10) Patent No.: US 10,673,668 B2
(45) Date of Patent: Jun. 2, 2020

(54) SIGNAL SENDING METHOD, SIGNAL RECEIVING METHOD, TERMINAL DEVICE, BASE STATION, AND SYSTEM

(71) Applicant: HUAWEI TECHNOLOGIES CO., LTD., Shenzhen, Guangdong (CN)

(72) Inventors: Tong Ji, Beijing (CN); Yiling Wu, Beijing (CN); Zhe Chen, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/029,313

(22) Filed: Jul. 6, 2018

(65) Prior Publication Data

US 2018/0316536 A1 Nov. 1, 2018

Related U.S. Application Data

(63) Continuation of application No. PCT/CN2016/070450, filed on Jan. 8, 2016.

(51) Int. Cl.
*H04W 74/08* (2009.01)
*H04L 27/26* (2006.01)
(Continued)

(52) U.S. Cl.
CPC ......... *H04L 27/2617* (2013.01); *H04B 7/216* (2013.01); *H04J 13/004* (2013.01);
(Continued)

(58) Field of Classification Search
CPC . H04L 27/26; H04L 27/2617; H04L 27/2605; H04W 74/08; H04W 74/0833
See application file for complete search history.

(56) References Cited

U.S. PATENT DOCUMENTS 8,831,115 B2 9/2014 Sutivong et al.
2005/0117628 A1* 6/2005 Brethour ............... H04B 1/7163
375/130

(Continued)

FOREIGN PATENT DOCUMENTS

CN 1588938 A 3/2005
CN 101005476 A 7/2007
(Continued)

*Primary Examiner* — Chi Ho A Lee
(74) *Attorney, Agent, or Firm* — Womble Bond Dickinson (US) LLP

(57) ABSTRACT

An embodiment of the present invention discloses a signal sending method, a signal receiving method, a terminal device, a base station, and a system, to ensure that a signal has a sufficiently large capacity when a PAPR is low, and reduce power consumption of the terminal device. The method in embodiments of the present invention includes: generating, by the terminal device, a first signal; performing, by the terminal device, code division processing on the first signal using a target code division sequence selected from a code division sequence set, to generate a second signal, where any two code division sequences in the code division sequence set meet orthogonality and shift orthogonality; and sending, by the terminal device, the second signal to the base station at a corresponding time-frequency resource location.

20 Claims, 9 Drawing Sheets

(51) Int. Cl.
*H04B 7/216* (2006.01)
*H04J 13/00* (2011.01)
*H04J 13/18* (2011.01)
*H04L 5/00* (2006.01)

(52) U.S. Cl.
CPC .......... *H04J 13/0055* (2013.01); *H04J 13/18* (2013.01); *H04L 27/2605* (2013.01); *H04W 74/0833* (2013.01); *H04L 5/0016* (2013.01)

(56) References Cited

U.S. PATENT DOCUMENTS

| | | | |
|---|---|---|---|
| 2005/0249298 A1* | 11/2005 | Kim | H04L 5/026 375/260 |
| 2007/0010203 A1* | 1/2007 | Wee | H04B 1/7103 455/63.1 |
| 2007/0263738 A1 | 11/2007 | Jitsukawa et al. | |
| 2009/0122839 A1 | 5/2009 | Luo et al. | |
| 2009/0129364 A1* | 5/2009 | Lee | H04L 12/4015 370/345 |
| 2010/0052928 A1* | 3/2010 | Tabib | G08B 26/001 340/653 |
| 2010/0056067 A1* | 3/2010 | Kim | H04L 27/12 455/69 |
| 2010/0195702 A1* | 8/2010 | Nakao | H04J 11/005 375/140 |
| 2012/0076175 A1 | 3/2012 | Kent et al. | |
| 2012/0092982 A1* | 4/2012 | Nakao | H04W 76/28 370/216 |
| 2012/0281732 A1 | 11/2012 | Nakao et al. | |
| 2013/0242720 A1 | 9/2013 | Chou | |
| 2013/0244642 A1 | 9/2013 | Bouvier Des Noes | |
| 2013/0336234 A1 | 12/2013 | Ghosh et al. | |
| 2015/0163005 A1 | 6/2015 | Kim et al. | |
| 2015/0163796 A1 | 6/2015 | Kim et al. | |

FOREIGN PATENT DOCUMENTS

| | | |
|---|---|---|
| CN | 101072068 A | 11/2007 |
| CN | 101682365 A | 3/2010 |
| CN | 101809911 A | 8/2010 |
| CN | 101821977 A | 9/2010 |
| CN | 102036380 A | 4/2011 |
| CN | 104065443 A | 9/2014 |

* cited by examiner

SIGNAL SENDING METHOD, SIGNAL RECEIVING METHOD, TERMINAL DEVICE, BASE STATION, AND SYSTEM

CROSS-REFERENCE TO RELATED APPLICATIONS

This application is a continuation of International Application No. PCT/CN2016/070450, filed on Jan. 8, 2016, the disclosure of which is hereby incorporated by reference in its entirety.

TECHNICAL FIELD

The present invention relates to the field of communications technologies, and in particular, to a signal sending method, a signal receiving method, a terminal device, a base station, and a system.

BACKGROUND

With rapid development of machine-to-machine (M2M) communications applications, a market requirement and scale are growing explosively. An M2M communications application has a service requirement different from that of a conventional communication service, such as deep coverage and low power consumption. A propagation latency exists in signal propagation. For example, in uplink transmission of a communications system, a signal sent by a terminal device to a base station at a moment 1 may be received by the base station at a moment 2 because a propagation latency exists in signal propagation. Therefore, before communicating with the base station, the terminal device needs to send a segment of training signal, so that the base station can estimate a latency of propagation between the base station and the terminal device, and then notify the terminal device of the latency. In this way, the terminal device can correspondingly send uplink data in advance based on the latency.

A current solution is as follows: In a Long Term Evolution (LTE) system, the terminal device simultaneously sends a random access channel (RACH) signal on 839 subcarriers, so that the base station estimates a propagation latency based on the received RACH signal.

A larger quantity of subcarriers occupied by a signal indicates a higher peak-to-average power ratio (PAPR) of the signal. In the foregoing solution, the RACH signal occupies 839 subcarriers of transmission bandwidth. Therefore, a PAPR in the foregoing solution can be excessively high. The excessively high PAPR reduces power amplifier efficiency of the terminal device, and consequently the terminal device needs quite high transmit power, causing an increase of power consumption of the terminal device.

SUMMARY

Embodiments of the present invention provide a signal sending method, a signal receiving method, a terminal device, a base station, and a system, to ensure that a signal has a sufficiently large capacity when a PAPR is low, and reduce power consumption of the terminal device.

A first aspect of the present invention provides a signal sending method, including:
 generating, by a terminal device, a first signal;
 performing, by the terminal device, code division processing on the first signal using a target code division sequence selected from a code division sequence set, to generate a second signal, where any two code division sequences in the code division sequence set meet orthogonality and shift orthogonality; and
 sending, by the terminal device, the second signal to a base station at a corresponding time-frequency resource location.

The first signal may be a RACH signal. The terminal device may generate the first signal in a plurality of manners. For example, the terminal device receives indication information from the base station, where the indication information is used to indicate content of the first signal, and the terminal device generates the first signal based on the content of the first signal. For another example, the terminal device generates the first signal based on content, pre-stored in the terminal device, of the first signal.

Because a propagation latency exists, any two code division sequences in the code division sequence set should meet orthogonality and shift orthogonality.

A beneficial effect of the first aspect is as follows: Because any two code division sequences in the code division sequence set meet orthogonality, first signals of different terminal devices can multiplex different code channels, and it is ensured that the first signal has a sufficiently large capacity. In addition, to eliminate impact exerted by the propagation latency on the orthogonality of the code division sequence set, any two code division sequences in the code division sequence set further need to meet shift orthogonality. In addition, the time-frequency resource location in the present invention may be preset, or may be obtained from an indication of the base station, so that the first signal occupies a few subcarriers or even one subcarrier in a frequency domain. In this way, a PAPR value that is excessively high is avoided. Note that power consumption of the terminal device is lower when a PAPR is low. Therefore, in embodiments of the present invention, it can be ensured that the first signal has a sufficiently large capacity when a PAPR is low, and the power consumption of the terminal device is reduced.

In one embodiment,
 the first signal includes at least one block, each block includes a cyclic prefix CP, and the CP has a length of a positive integer quantity of symbols; and
 the performing, by the terminal device, code division processing on the first signal using a target code division sequence selected from a code division sequence set includes:
 performing, by the terminal device, code division processing on each block of the first signal using the target code division sequence selected from the code division sequence set.

A beneficial effect of the above embodiment is as follows: The cyclic prefix is set to deal with an unknown propagation latency.

In one embodiment,
 the performing, by the terminal device, code division processing on each block of the first signal using the target code division sequence selected from the code division sequence set is specifically:
 performing, by the terminal device on a per symbol basis, dot multiplication or conjugate dot multiplication on a part other than the CP in each block of the first signal and the target code division sequence, where the target code division sequence is a code division sequence selected from the code division sequence set; and
 performing, by the terminal device, same processing on the CP in each block of the first signal as a symbol corresponding to the CP.

A beneficial effect of the above embodiment is as follows: Code division processing is performed on a per symbol basis, so that a capacity of the first signal is increased.

In one embodiment, the first signal includes at least two blocks, and the performing, by the terminal device, code division processing on the first signal using a target code division sequence selected from a code division sequence set includes:

performing, by the terminal device on a per block basis, dot multiplication or conjugate dot multiplication on the at least two blocks and the target code division sequence, where the target code division sequence is selected by the terminal from the code division sequence set.

A beneficial effect of the above embodiment is as follows: Code division processing is performed on a per block basis, so that a capacity of the first signal is increased.

In one embodiment, the first signal includes at least two blocks, each block includes a cyclic prefix CP, and the CP has a length of a positive integer quantity of symbols; and the performing, by the terminal device, code division processing on the first signal using a target code division sequence selected from a code division sequence set includes:

performing, by the terminal device on a per symbol basis, dot multiplication or conjugate dot multiplication on a part other than the CP in each block of the first signal and a first target code division sequence, and performing, on a per block basis, dot multiplication or conjugate dot multiplication on the at least two blocks and a second target code division sequence, where the first target code division sequence is selected by the terminal device from a first code division sequence set, the second target code division sequence is selected by the terminal device from a second code division sequence set, any two code division sequences in the first code division sequence set meet orthogonality and shift orthogonality, and any two code division sequences in the second code division sequence set meet orthogonality and shift orthogonality; and performing, by the terminal device, same processing on the CP in each block of the first signal as a symbol corresponding to the CP.

A beneficial effect of the above embodiment is as follows: Code division processing is performed both on a per block basis and on a per symbol basis, so that a capacity of the first signal is further increased.

In one embodiment, a code division sequence $w^u$ in the code division sequence set is generated according to the following formula:

$$w^u = \{w_k^u\}_{k=0}^{L-1} : w_k^u = e^{j2\pi u k/L}, \text{ where}$$

a value range of k is 0 to L−1, a value range of u is 0 to L−1, and L represents a length of the code division sequence.

A beneficial effect of the above embodiment is as follows: A method for generating a code division sequence is provided, so that technical solutions in the present invention are improved.

In one embodiment, the performing, by the terminal device, code division processing on the first signal using a target code division sequence selected from a code division sequence set includes:

performing, by the terminal device, code division processing on the first signal using a target code division sequence selected from a code division sequence set pre-stored in the terminal device.

A beneficial effect of the above embodiment is as follows: A method for storing a code division sequence set is provided, so that more optional solutions are provided.

In some embodiments, before the generating, by a terminal, a first signal, the method includes:

receiving, by the terminal device, indication information sent by the base station, where the indication information is used to indicate the time-frequency resource location.

A beneficial effect of the above embodiments is as follows: The time-frequency resource location is determined using the indication information from the base station, so that more optional solutions are provided.

In one embodiment, the indication information is further used to indicate content of the first signal and/or the code division sequence set.

A second aspect of the present invention provides a signal receiving method, including:

receiving, by a base station, a second signal sent by a terminal device at a corresponding time-frequency resource location, where the second signal is a signal generated after the terminal device generates a first signal and then performs code division processing on the first signal using a target code division sequence selected from a code division sequence set, and any two code division sequences in the code division sequence set meet orthogonality and shift orthogonality;

performing, by the base station, grid processing on the target code division sequence to obtain a target cyclic shift sequence; and performing, by the base station, de-orthogonality on the second signal using the target cyclic shift sequence, to generate a third signal.

After generating the third signal, the base station may calculate a propagation latency using the third signal.

A beneficial effect of the second aspect is as follows: The base station performs grid processing on the target code division sequence, so that accuracy of performing de-orthogonality on the second signal is ensured.

In one embodiment, if the first signal includes only one block, the performing, by the base station, grid processing on the target code division sequence to obtain a target cyclic shift sequence is specifically:

performing, by the base station, first over-sampling on the target code division sequence to obtain a first over-sampling sequence;

separately performing, by the base station, de-orthogonality on the block using different cyclic shift sequences of the first over-sampling sequence, to obtain a first complex number value set; and using, by the base station as the target cyclic shift sequence, a cyclic shift sequence corresponding to a complex number value that has a maximum modulus in the first complex number value set.

In one embodiment, after obtaining the first over-sampling sequence, the base station separately performs de-orthogonality on the block using different cyclic shift sequences of the first over-sampling sequence, and then performs conjugate dot multiplication on a symbol in the block and the first signal, to obtain the first complex number value set by means of combination. If symbols in the block are repeated symbols, the repeated symbols are directly combined. Each cyclic shift sequence is corresponding to one complex number value.

The de-orthogonality means performing dot multiplication or conjugate dot multiplication on the second signal and the target cyclic shift sequence. If the terminal device performs dot multiplication during code division processing, the base station correspondingly performs conjugate dot multiplication during de-orthogonality. If the terminal device performs conjugate dot multiplication during code division processing, the base station correspondingly performs dot multiplication during de-orthogonality.

A beneficial effect of the above embodiments is as follows: When the first signal includes only one block, a specific implementation manner for obtaining the target cyclic shift sequence by means of grid processing is provided, so that technical solutions in the present invention are improved.

In one embodiment, if the first signal includes a plurality of blocks, the performing, by the base station, grid processing on the target code division sequence to obtain a target cyclic shift sequence is specifically:

performing, by the base station, second over-sampling on the target code division sequence to obtain a second over-sampling sequence;

performing, by the base station, de-orthogonality on each of the plurality of blocks using different cyclic shift sequences of the second over-sampling sequence, to obtain a second complex number value set; and determining, by the base station based on the second complex number value set, a plurality of complex number values corresponding to each cyclic shift sequence, and obtaining a sum of modulus values of the plurality of complex number values corresponding to each cyclic shift sequence; and using, by the base station as the target cyclic shift sequence, a cyclic shift sequence corresponding to a maximum modulus.

A quantity of the plurality of complex number values corresponding to each cyclic shift sequence is equal to a quantity of blocks in the first signal.

A beneficial effect of the above embodiment is as follows: When the first signal includes a plurality of blocks, a specific implementation manner for obtaining the target cyclic shift sequence by means of grid processing is provided, so that technical solutions in the present invention are improved.

In one embodiment, the method further includes:

determining a shift value of the target cyclic shift sequence relative to the target code division sequence; and determining a propagation latency based on the shift value.

A beneficial effect of the above embodiment is as follows: The propagation latency is preliminarily estimated, so that the technical solutions in the present invention are enriched.

In one embodiment, before the receiving, by a base station, a second signal sent by a terminal device at a corresponding time-frequency resource location, the method further includes:

sending indication information to the terminal device, where the indication information is used to indicate the time-frequency resource location.

In one embodiment, the indication information is further used to indicate content of the first signal and/or the code division sequence set.

A third aspect of the present invention provides a terminal device, including:

a processing module, configured to: generate a first signal, and perform code division processing on the first signal using a target code division sequence selected from a code division sequence set, to generate a second signal, where any two code division sequences in the code division sequence set meet orthogonality and shift orthogonality; and a sending module, configured to send the second signal to a base station at a corresponding time-frequency resource location.

The first signal may be a RACH signal. The processing module may generate the first signal in a plurality of manners. For example, the processing module receives indication information from the base station, where the indication information is used to indicate content of the first signal, and the processing module generates the first signal based on the content of the first signal. For another example, the processing module generates the first signal based on content, pre-stored in the terminal device, of the first signal.

Because a propagation latency exists, any two code division sequences in the code division sequence set should meet orthogonality and shift orthogonality.

A beneficial effect of the third aspect is as follows: Because any two code division sequences in the code division sequence set meet orthogonality, first signals of different terminal devices can multiplex different code channels, and it is ensured that the first signal has a sufficiently large capacity. In addition, to overcome impact exerted by the propagation latency on the orthogonality of the code division sequence set, any two code division sequences in the code division sequence set further need to meet shift orthogonality. In addition, the time-frequency resource location in the present invention may be preset, or may be obtained from an indication of the base station, so that the first signal occupies a few subcarriers or even one subcarrier in a frequency domain. In this way, a PAPR value that is excessively high is avoided. Note that power consumption of the terminal device is lower when a PAPR is low. Therefore, in embodiments of the present invention, it can be ensured that the first signal has a sufficiently large capacity when a PAPR is low, and the power consumption of the terminal device is reduced.

In one embodiment, the processing module is configured to: when the first signal includes at least one block, each block includes a cyclic prefix CP, and the CP has a length of a positive integer quantity of symbols, perform code division processing on each block of the first signal using the target code division sequence selected from the code division sequence set, to generate the second signal.

A beneficial effect of the above embodiment is as follows: The cyclic prefix is set to deal with an unknown propagation latency.

In one embodiment, the processing module is configured to: perform, on a per symbol basis, dot multiplication or conjugate dot multiplication on a part other than the CP in each block of the first signal and the target code division sequence, and perform same processing on the CP in each block of the first signal as a symbol corresponding to the CP, to generate the second signal, where the target code division sequence is a code division sequence selected from the code division sequence set.

A beneficial effect of the above embodiment is as follows: Code division processing is performed on a per symbol basis, so that a capacity of the first signal is increased.

In one embodiment, the processing module is configured to: when the first signal includes at least two blocks, perform, on a per block basis, dot multiplication or conjugate dot multiplication on the at least two blocks and the target code division sequence, to generate the second signal, where the target code division sequence is selected by the terminal from the code division sequence set.

A beneficial effect of the above embodiment is as follows: Code division processing is performed on a per block basis, so that a capacity of the first signal is increased.

In one embodiment, the processing module is configured to: when the first signal includes at least two blocks, each block includes a cyclic prefix CP, and the CP has a length of a positive integer quantity of symbols, perform, on a per symbol basis, dot multiplication or conjugate dot multiplication on a part other than the CP in each block of the first signal and a first target code division sequence; perform, on a per block basis, dot multiplication or conjugate dot multiplication on the at least two blocks and a second target code division sequence; and perform same processing on the CP in each block of the first signal as a symbol corresponding to the CP, to generate the second signal, where the first target code division sequence is selected by the terminal device from a first code division sequence set, the second target code division sequence is selected by the terminal device from a second code division sequence set, any two code division sequences in the first code division sequence set meet orthogonality and shift orthogonality, and any two code division sequences in the second code division sequence set meet orthogonality and shift orthogonality.

A beneficial effect of the above embodiment is as follows: Code division processing is performed both on a per block basis and on a per symbol basis, so that a capacity of the first signal is further increased.

In one embodiment, a code division sequence $w^u$ in the code division sequence set is generated according to the following formula:

$$w^u = \{w_k^u\}_{k=0}^{L-1} : w_k^u = e^{j2\pi uk/L}, \text{ where}$$

a value range of k is 0 to L−1, a value range of u is 0 to L−1, and L represents a length of the code division sequence.

In one embodiment, the processing module is configured to perform code division processing on the first signal using a target code division sequence selected from a code division sequence set pre-stored in the terminal device, to generate the second signal.

In one embodiment, the terminal further includes:

a receiving module, configured to receive indication information sent by the base station, where the indication information is used to indicate the time-frequency resource location.

A beneficial effect of the above embodiment is as follows: The time-frequency resource location is determined using the indication information from the base station, so that more optional solutions are provided.

In one embodiment, the indication information is further used to indicate content of the first signal and/or the code division sequence set.

A fourth aspect of the present invention provides a base station, including:

a receiving module, configured to receive a second signal sent by a terminal device at a corresponding time-frequency resource location, where the second signal is a signal generated after the terminal device generates a first signal and then performs code division processing on the first signal using a target code division sequence selected from a code division sequence set, and any two code division sequences in the code division sequence set meet orthogonality and shift orthogonality; and a processing module, configured to: perform grid processing on the target code division sequence to obtain a target cyclic shift sequence, and perform de-orthogonality on the second signal using the target cyclic shift sequence, to generate a third signal.

After generating the third signal, the base station may calculate a propagation latency using the third signal.

A beneficial effect of the fourth aspect is as follows: The base station performs grid processing on the target code division sequence, so that accuracy of performing de-orthogonality on the second signal is ensured.

In one embodiment, the processing module is configured to: if the first signal includes only one block, perform first over-sampling on the target code division sequence to obtain a first over-sampling sequence; separately perform de-orthogonality on the block using different cyclic shift sequences of the first over-sampling sequence, to obtain a first complex number value set; and use, as the target cyclic shift sequence, a cyclic shift sequence corresponding to a complex number value that has a maximum modulus in the first complex number value set.

After obtaining the first over-sampling sequence, in one embodiment, the base station separately performs de-orthogonality on the block using different cyclic shift sequences of the first over-sampling sequence, and then performs conjugate dot multiplication on a symbol in the block and the first signal, to obtain the first complex number value set by means of combination. If symbols in the block are repeated symbols, the repeated symbols are directly combined. Each cyclic shift sequence is corresponding to one complex number value.

The de-orthogonality means performing dot multiplication or conjugate dot multiplication on the second signal and the target cyclic shift sequence. If the terminal device performs dot multiplication during code division processing, the base station correspondingly performs conjugate dot multiplication during de-orthogonality. If the terminal device performs conjugate dot multiplication during code division processing, the base station correspondingly performs dot multiplication during de-orthogonality.

In one embodiment, the processing module is configured to: if the first signal includes a plurality of blocks, perform second over-sampling on the target code division sequence to obtain a second over-sampling sequence; perform de-orthogonality on each of the plurality of blocks using different cyclic shift sequences of the second over-sampling sequence, to obtain a second complex number value set; determine, based on the second complex number value set, a plurality of complex number values corresponding to each cyclic shift sequence, and perform a modulo operation on a sum of the plurality of complex number values corresponding to each cyclic shift sequence; and use, as the target cyclic shift sequence, a cyclic shift sequence corresponding to a maximum modulus.

In one embodiment, the processing module is further configured to: determine a shift value of the target cyclic shift sequence relative to the target code division sequence, and determine a propagation latency based on the shift value.

A beneficial effect of the above embodiment is as follows: The propagation latency is preliminarily estimated, so that the technical solutions in the present invention are enriched.

In one embodiment, the base station further includes:

a sending module, configured to send indication information to the terminal device, where the indication information is used to indicate the time-frequency resource location.

In one embodiment, the indication information is further used to indicate content of the first signal and/or the code division sequence set.

A fifth aspect of the present invention provides a system, including:

a terminal device and a base station, where the terminal device is configured to: generate a first signal; perform code division processing on the first signal using a target code division sequence selected from a code division sequence set, to generate a second signal, where any two code division sequences in the code division sequence set meet orthogonality and shift orthogonality; and send the second signal to the base station at a corresponding time-frequency resource location; and the base station is configured to: receive the second signal sent by the terminal device at the corresponding time-frequency resource location; perform grid processing on the target code division sequence to obtain a target cyclic shift sequence; and perform de-orthogonality on the second signal using the target cyclic shift sequence, to generate a third signal.

A beneficial effect of the fifth aspect is as follows: Because any two code division sequences in the code division sequence set meet orthogonality, first signals of different terminal devices can multiplex different code channels, and it is ensured that the first signal has a sufficiently large capacity. In addition, to overcome impact exerted by a propagation latency on the orthogonality of the code division sequence set, any two code division sequences in the code division sequence set further need to meet shift orthogonality. In addition, the time-frequency resource location in the present invention may be preset, or may be obtained from an indication of the base station, so that the first signal occupies a few subcarriers or even one subcarrier in a frequency domain. In this way, a PAPR value that is excessively high is avoided. Note that power consumption of the terminal device is lower when a PAPR is low. The base station performs grid processing on the target code division sequence, so that accuracy of performing de-orthogonality on the second signal is ensured.

In one embodiment, the base station is further configured to calculate a propagation latency based on the third signal.

When the first signal includes at least two blocks, after the third signal is obtained, when it is ensured that two blocks in the third signal have different frequency resources, the propagation latency may be calculated based on a phase difference between the two blocks in the third signal. The frequency resources can include a subcarrier, a carrier, and a channel. If the first signal includes only one block, the propagation latency may be calculated based on relevancy of the target code division sequence.

Because any two code division sequences in the code division sequence set meet orthogonality, first signals of different terminal devices can multiplex different code channels, and it is ensured that the first signal has a sufficiently large capacity. In addition, to overcome impact exerted by the propagation latency on the orthogonality of the code division sequence set, any two code division sequences in the code division sequence set meet shift orthogonality. In addition, the time-frequency resource location in the present invention may be preset, or may be obtained from an indication of the base station, so that the first signal occupies a few subcarriers or even one subcarrier in a frequency domain. In this way, a PAPR value that is excessively high is avoided. Note that power consumption of the terminal device is lower when a PAPR is low. Therefore, in embodiments of the present invention, it can be ensured that the first signal has a sufficiently large capacity when a PAPR is low, and the power consumption of the terminal device is reduced.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show only some embodiments of the present invention, and persons of ordinary skill in the art may still derive other drawings from these accompanying drawings without creative efforts.

DESCRIPTION OF EMBODIMENTS

Figure 1:
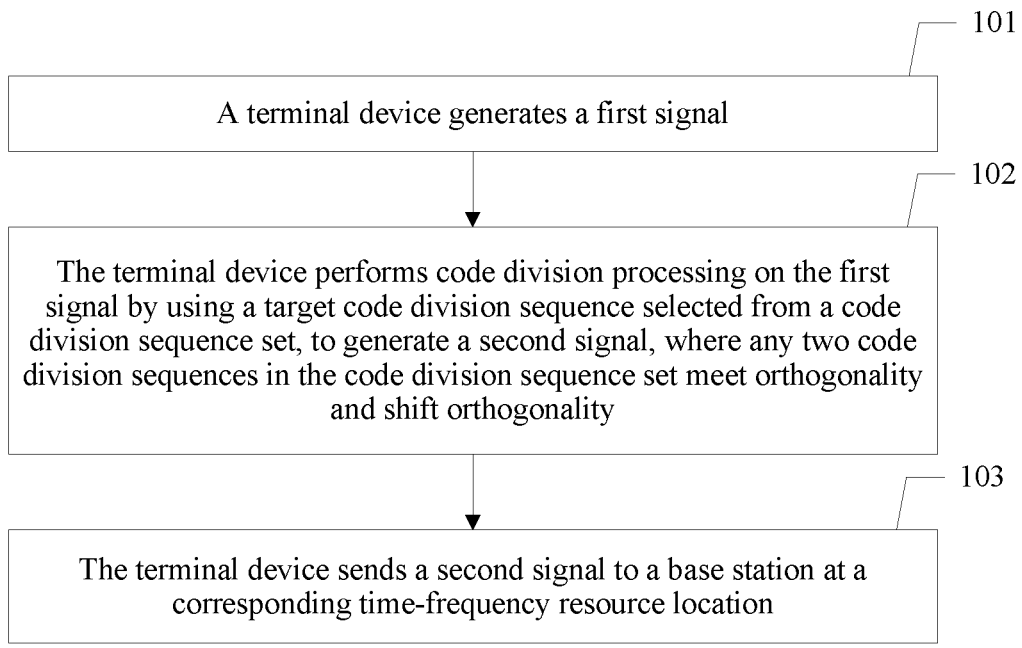
FIG. 1 is a schematic diagram of an embodiment of a signal sending method according to an embodiment of the present invention.

Embodiments of the present invention provide a signal sending method, a signal receiving method, a terminal device, a base station, and a system, to ensure that a signal has a sufficiently large capacity when a PAPR is low, and reduce power consumption of the terminal device.

To make persons skilled in the art understand the technical solutions in the present invention better, the following clearly describes the technical solutions in the embodiments of the present invention with reference to the accompanying drawings in the embodiments of the present invention. Apparently, the described embodiments are only some rather than all of the embodiments of the present invention. All other embodiments obtained by persons of ordinary skill in the art based on the embodiments of the present invention without creative efforts shall fall within the protection scope of the present invention.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way is interchangeable in proper circumstances, so that the embodiments of the present invention described herein can be implemented in an order other than the order illustrated or described herein. Moreover, the terms "include", "contain" and any other variants mean to cover the non-exclusive inclusion, for example, a process, a method, a system, a product, or a device that includes a list of operations or units is not necessarily limited to those operations or units, but may include other operations or units not expressly listed or inherent to such a process, method, system, product, or device.

Although an LTE system is used as an example for description in the foregoing background, persons skilled in the art should know that the present invention is not only applicable to the LTE system, but also applicable to another wireless communications system, such as a Global System for Mobile communications (GSM), a Universal Mobile Telecommunications System (UMTS), a Code Division Multiple Access (CDMA) system, or a new network system. The following describes specific embodiments using the LTE system as an example.

The terminal device in embodiments of the present invention may be a device that provides voice and/or data connectivity for a user, a handheld device with a wireless connection function, or another processing device connected to a wireless modem. A wireless terminal may communicate with one or more core networks using a radio access network (RAN). The wireless terminal may be a mobile terminal such as a mobile phone (or referred to as a "cellular" phone) or a computer with a mobile terminal. For example, the wireless terminal may be a portable, pocket-sized, handheld, computer built-in, or in-vehicle mobile apparatus that exchanges voice and/or data with the radio access network. For example, the wireless terminal may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile station, a remote station, an access point, a remote terminal, an access terminal, a user terminal, a user agent, a user device, or user equipment.

The base station in embodiments of the present invention may be configured to perform conversion between a received over-the-air frame and an IP packet, and serve as a router between the wireless terminal and the rest of an access network, where the rest of the access network may include an Internet Protocol (IP) network. The base station may further coordinate attribute management of an air interface. For example, the base station may be a base transceiver station (BTS, Base Transceiver Station) in GSM or CDMA, or may be a NodeB (NodeB) in WCDMA, or may be an evolved NodeB (eNB or e-NodeB, evolutional NodeB) in LTE. This is not limited in this application.

The following operations describe the signal sending method in an embodiment of the present invention.

Operation 101. A terminal device generates a first signal.

In one embodiment, the first signal may be a RACH signal or another type of signal. This is not limited herein.

In addition, the terminal device may generate the first signal in a plurality of manners. For example, the terminal device receives indication information from the base station, where the indication information is used to indicate content of the first signal, and the terminal device generates the first signal based on the content of the first signal. For another example, the terminal device generates the first signal based on content, pre-stored in the terminal device, of the first signal.

Operation 102. The terminal device performs code division processing on the first signal using a target code division sequence selected from a code division sequence set, to generate a second signal, where any two code division sequences in the code division sequence set meet orthogonality and shift orthogonality.

In one embodiment, the code division sequence set may be pre-stored in the terminal device, or may be indicated by the indication information received from the base station, and the terminal device determines the code division sequence set based on the indication information.

It should be noted that because a propagation latency exists, any two code division sequences in the code division sequence set need to meet orthogonality and shift orthogonality. The shift orthogonality is described below.

Operation 103. The terminal device sends a second signal to a base station at a corresponding time-frequency resource location.

In one embodiment, after the terminal device generates the second signal, the terminal device sends the second signal to the base station at the corresponding time-frequency resource location.

In one embodiment, because any two code division sequences in the code division sequence set meet orthogonality, first signals of different terminal devices can multiplex different code channels, and it is ensured that the first signal has a sufficiently large capacity. In addition, to overcome impact exerted by the propagation latency on the orthogonality of the code division sequence set, any two code division sequences in the code division sequence set further should meet shift orthogonality. In addition, the time-frequency resource location in the present invention may be preset, or may be obtained from an indication of the base station, so that the first signal occupies a few subcarriers or even one subcarrier in a frequency domain. In this way, a PAPR value that is excessively high is avoided. Note that power consumption of the terminal device is lower when a PAPR is low. Therefore, in embodiments of the present invention, it can be ensured that the first signal has a sufficiently large capacity when a PAPR is low, and the power consumption of the terminal device is reduced.

It should be noted that in embodiments of the present invention, code division processing may be performed on the first signal in a plurality of manners, and corresponding description is given in the following with reference to specific embodiments.

Figure 2:
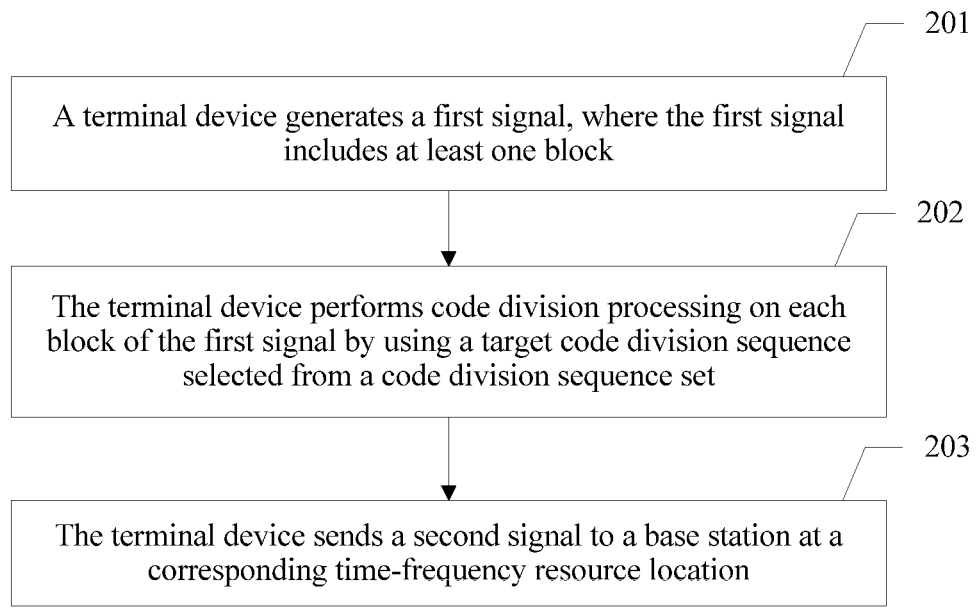
FIG. 2 is a schematic diagram of another embodiment of a signal sending method according to an embodiment of the present invention.

Referring to FIG. 2, another embodiment of a signal sending method in an embodiment of the present invention includes the following operations.

Operation 201. A terminal device generates a first signal, where the first signal includes at least one block.

In one embodiment, the first signal includes at least one block, each block includes a cyclic prefix (CP), and the CP has a length of a positive integer quantity of symbols.

It should be noted that the cyclic prefix is set to deal with an unknown propagation latency, and is denoted as CP. A quantity of symbols in the CP is related to the propagation latency. If the propagation latency is longer, the quantity of symbols in the CP may correspondingly increase. A condition of the increase is that a current guard time is greater than or equal to two times of the propagation latency.

It should be noted that the propagation latency is a time consumed when a signal is sent from the terminal device to a base station.

For clarity of description, that the CP includes one symbol is used as an example for description in the following descriptions.

Operation 202. The terminal device performs code division processing on each block of the first signal using a target code division sequence selected from a code division sequence set.

In one embodiment, any two code division sequences in the code division sequence set meet orthogonality and shift orthogonality.

That the terminal device performs code division processing on each block of the first signal using a target code division sequence selected from a code division sequence set is as follows:

The terminal device performs, in one embodiment, on a per symbol basis, dot multiplication or conjugate dot multiplication on a part other than the CP in each block of the first signal and the target code division sequence, where the target code division sequence is a code division sequence selected from the code division sequence set; and the terminal device performs same processing on the CP in each block of the first signal as a symbol corresponding to the CP.

To help a reader understand a process, in the present invention, in which the terminal device performs code division processing on each block of the first signal using the target code division sequence selected from the code division sequence set, description is given in the following using an example.

Figure 3:
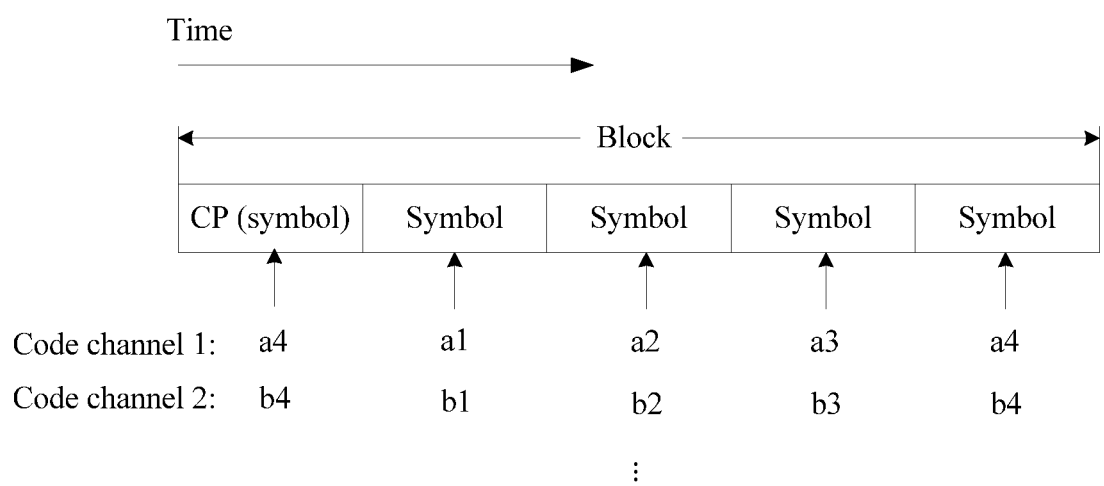
FIG. 3 is a diagram of a relationship between a symbol in a block and a code division sequence in a code division sequence set according to an embodiment of the present invention.

FIG. 3 is used as an example. It is assumed that one block of the first signal includes five symbols, and any two code division sequences in the code division sequence set are a code division sequence 1 and a code division sequence 2: {a1, a2, a3, a4} and {b1, b2, b3, b4}. That any two code division sequences in the code division sequence set meet orthogonality means that a sum of conjugate dot multiplication of the two code division sequences is 0, that is, $a_1b_1^* + a_2b_2^* + a_3b_3^* + a_4b_4^* = 0$. That any two code division sequences in the code division sequence set meet shift orthogonality means that the code division sequence 1 obtained after a cyclic shift and the code division sequence 2 still meet orthogonality, or the code division sequence 2 obtained after a cyclic shift and the code division sequence 1 still meet orthogonality. The shift orthogonality may be N-shift orthogonality based on different quantities of cyclic shifts. For example, one-shift orthogonality means that the code division sequence 2 obtained after one cyclic shift and the code division sequence 1 are still orthogonal, that is, $a_1b_2^* + a_2b_3^* + a_3b_4^* + a_4b_1^* = 0$; and two-shift orthogonality means that the code division sequence 1 obtained after two cyclic shifts and the code division sequence 2 are still orthogonal, that is, $a_1b_3^* + a_2b_4^* + a_3b_1^* + a_4b_2^* = 0$. Based on the foregoing description of the orthogonality and the shift orthogonality, the terminal device may perform, on a per symbol basis, dot multiplication or conjugate dot multiplication on the part other than the CP in each block of the first signal and the target code division sequence. The target code division sequence is a code division sequence selected from the code division sequence set. The terminal device performs same processing on the CP in each block of the first signal as the symbol corresponding to the CP.

Figure 4:
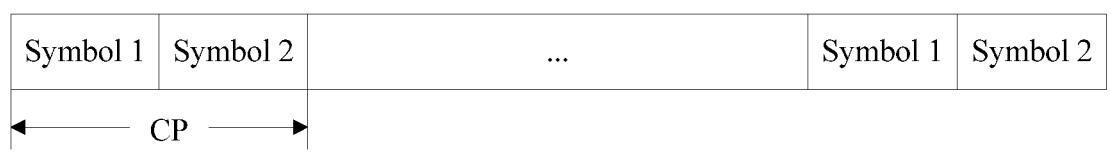
FIG. 4 is a schematic diagram of a cyclic prefix in a segment of signal according to an embodiment of the present invention.

It should be noted that the CP and the symbol corresponding to the CP are as follows: Assuming that a CP in one block of the first signal includes only one symbol, a symbol corresponding to the CP is the last symbol in the block; or assuming that a CP in one block of the first signal includes two symbols that are the first symbol in the block and the second symbol in the block, a symbol corresponding to the first symbol is the last but one symbol in the block, and a symbol corresponding to the second symbol is the last symbol in the block. Generally, symbols included in a CP in a segment of signal are some symbols at the end of the segment of signal, and symbols corresponding to the CP are some symbols at the end of the segment of signal. Referring to FIG. 4, FIG. 4 shows a segment of signal. A CP includes two symbols that are a symbol 1 and a symbol 2. Symbols corresponding to the symbol 1 and the symbol 2 are shown in FIG. 4.

In addition, there may be a plurality of options for the code division sequence in the code division sequence set in embodiments of the present invention. This embodiment of the present invention provides a method for generating a code division sequence, and the method is as follows:

A code division sequence $w^u$ in the code division sequence set is generated according to the following formula:

$$w^u = \{w_k^u\}_{k=0}^{L-1} : w_k^u = e^{j2\pi u k/L}, \text{ where}$$

a value range of k is 0 to L−1, a value range of u is 0 to L−1, and L represents a length of the code division sequence.

For example, according to the foregoing formula, assuming that L=4, the code division sequence set includes four sequences: $w^0, w^1, w^2, w^3$ which are respectively:

$w^0 = \{1,1,1,1\}$
$w^1 = \{1,j,-1,-j\}$
$w^2 = \{1,-1,1,-1\}$
$w^3 = \{1,-j,-1,j\}$, where j represents an imaginary unit.

Operation 203. The terminal device sends a second signal to a base station at a corresponding time-frequency resource location.

In this embodiment, after the terminal device generates the second signal, the terminal device sends the second signal to the base station at the corresponding time-frequency resource location.

The terminal device determines the time-frequency resource location based on an indication from the base station, or the terminal device presets the time-frequency resource location.

In one embodiment, corresponding description of the time-frequency resource location is given in some embodiments of the present invention, and is as follows:

The terminal device receives indication information sent by the base station, where the indication information is used to indicate the time-frequency resource location.

Further, in some embodiments of the present invention, the indication information is further used to indicate content of the first signal and/or the code division sequence set.

In this embodiment, because any two code division sequences in the code division sequence set meet orthogonality, first signals of different terminal devices can multiplex different code channels, and it is ensured that the first signal has a sufficiently large capacity. In addition, to overcome impact exerted by the propagation latency on the orthogonality of the code division sequence set, any two code division sequences in the code division sequence set further need to meet shift orthogonality. In addition, the time-frequency resource location in embodiments of the present invention may be preset, or may be obtained from an indication of the base station, so that the first signal occupies a few subcarriers or even one subcarrier in a frequency domain. In this way, a PAPR value that is excessively high is avoided. Note that power consumption of the terminal device is lower when a PAPR is low. Therefore, in embodiments of the present invention, it can be ensured that the first signal has a sufficiently large capacity when a PAPR is low, and the power consumption of the terminal device is reduced.

In addition, in one embodiment, code division processing is performed on a per symbol basis, so that a capacity of the first signal is increased.

Further, an embodiment provides the method for generating a code division sequence, so that technical solutions in the present invention are improved.

Figure 5:
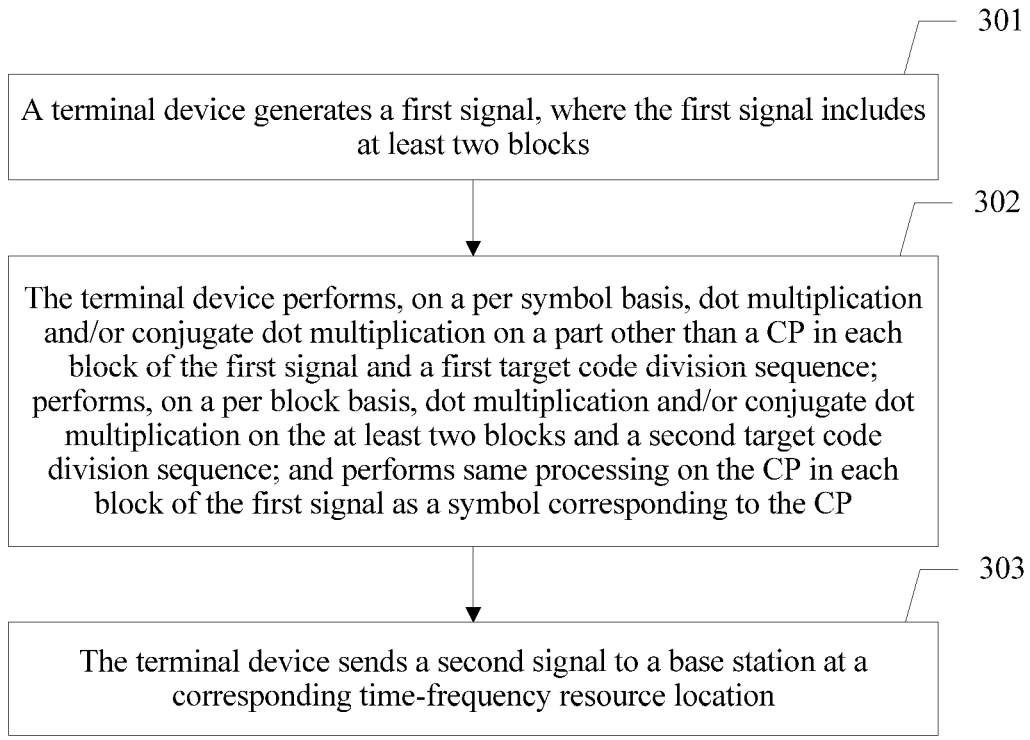
FIG. 5 is a schematic diagram of another embodiment of a signal sending method according to an embodiment of the present invention.

Referring to FIG. 5, an embodiment of a signal sending method includes the following operations.

Operation 301. A terminal device generates a first signal, where the first signal includes at least two blocks.

In one embodiment, the first signal includes at least two blocks, each block includes a cyclic prefix CP, and the CP has a length of a positive integer quantity of symbols.

It should be noted that the cyclic prefix is set to deal with an unknown propagation latency, and is denoted as CP. A quantity of symbols in the CP is related to the propagation latency. If the propagation latency is longer, the quantity of symbols in the CP may correspondingly increase. A condition of the increase is that a current guard time is greater than or equal to two times of the propagation latency.

Operation 302. The terminal device performs, on a per symbol basis dot multiplication or conjugate dot multiplication on a part other than a CP in each block of the first signal and a first target code division sequence; performs, on a per block basis, dot multiplication or conjugate dot multiplication on the at least two blocks and a second target code division sequence; and performs same processing on the CP in each block of the first signal as a symbol corresponding to the CP.

In one embodiment, the first target code division sequence is selected by the terminal device from a first code division sequence set, the second target code division sequence is selected by the terminal device from a second code division sequence set, any two code division sequences in the first code division sequence set meet orthogonality and shift orthogonality, and any two code division sequences in the second code division sequence set meet orthogonality and shift orthogonality.

Operation 303. The terminal device sends a second signal to a base station at a corresponding time-frequency resource location.

In one embodiment, operation 303 is similar to operation 203, and details are not described herein again.

In one embodiment, because any two code division sequences in the code division sequence set meet orthogonality, first signals of different terminal devices can multiplex different code channels, and it is ensured that the first signal has a sufficiently large capacity. In addition, to overcome impact exerted by the propagation latency on the orthogonality of the code division sequence set, any two code division sequences in the code division sequence set further need to meet shift orthogonality. In addition, the time-frequency resource location in the present invention may be preset, or may be obtained from an indication of the base station, so that the first signal occupies a few subcarriers or even one subcarrier in a frequency domain. In this way, a PAPR value that is excessively high is avoided. Note that power consumption of the terminal device is lower when a PAPR is low. Therefore, in embodiments of the present invention, it can be ensured that the first signal has a sufficiently large capacity when a PAPR is low, and the power consumption of the terminal device is reduced.

In addition, in one embodiment, code division processing is performed on a per block basis and on a per symbol basis, so that a capacity of the first signal is further increased in comparison with the embodiment corresponding to FIG. 2.

Figure 6:
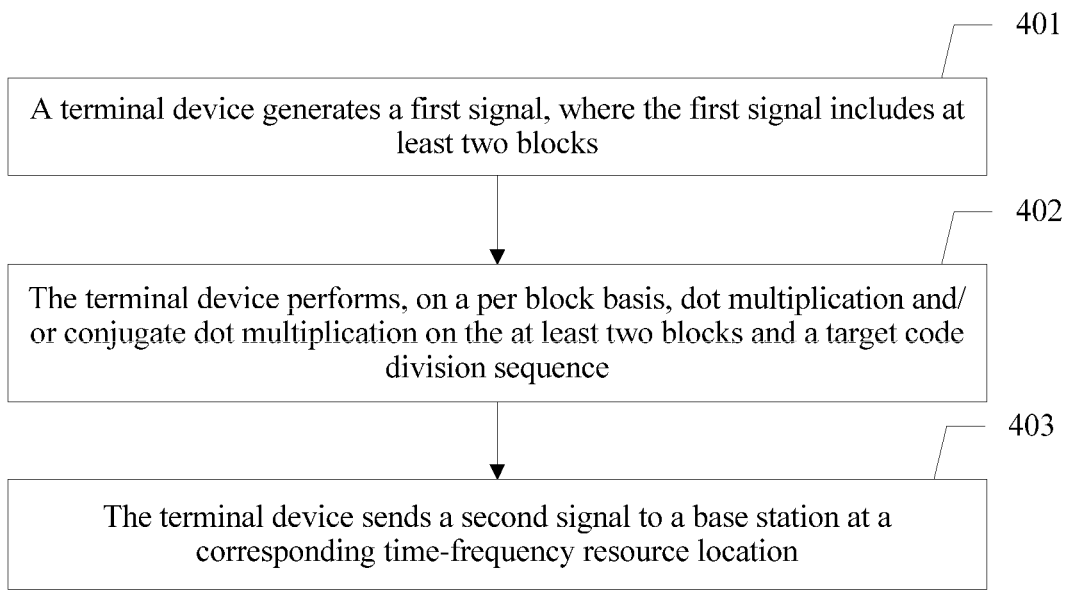
FIG. 6 is a schematic diagram of another embodiment of a signal sending method according to an embodiment of the present invention.

Referring to FIG. 6, in another embodiment, a signal sending method i includes the following operations.

Operation 401. A terminal device generates a first signal, where the first signal includes at least two blocks.

Operation 402. The terminal device performs, on a per block basis, dot multiplication or conjugate dot multiplication on the at least two blocks and a target code division sequence.

In one embodiment, the target code division sequence is selected by the terminal from a code division sequence set, and any two code division sequences in the code division sequence set meet orthogonality and shift orthogonality.

It should be noted that any two code division sequences in the code division sequence set may meet only orthogonality in some embodiments of the present invention. For example, any two code division sequences in the code division sequence set may meet only orthogonality in an embodiment in which code division processing is performed on a per block basis and in an embodiment in which code division processing is performed on a per block basis and on a per symbol basis.

Operation 403. The terminal device sends a second signal to a base station at a corresponding time-frequency resource location.

In one embodiment, operation 403 is similar to operation 203, and details are not described herein again.

In one embodiment, because any two code division sequences in the code division sequence set meet orthogonality and shift orthogonality, first signals of different terminal devices can multiplex different code channels, and it is ensured that the first signal has a sufficiently large capacity. In addition, the time-frequency resource location in the present invention may be preset, or may be obtained from an indication of the base station, so that the first signal occupies a few subcarriers or even one subcarrier in a frequency domain. In this way, a PAPR value is excessively high is avoided. Note that power consumption of the terminal device is lower when a PAPR is low. Therefore, in embodiments of the present invention, it can be ensured that the first signal has a sufficiently large capacity when a PAPR is low, and the power consumption of the terminal device is reduced.

In addition, in one embodiment, code division processing is performed on a per block basis, so that a capacity of the first signal is increased.

The foregoing describes the technical solutions for embodiments in the present invention from a perspective of the terminal device. The following describes the technical solutions for embodiments in the present invention from a perspective of the base station.

Figure 7:
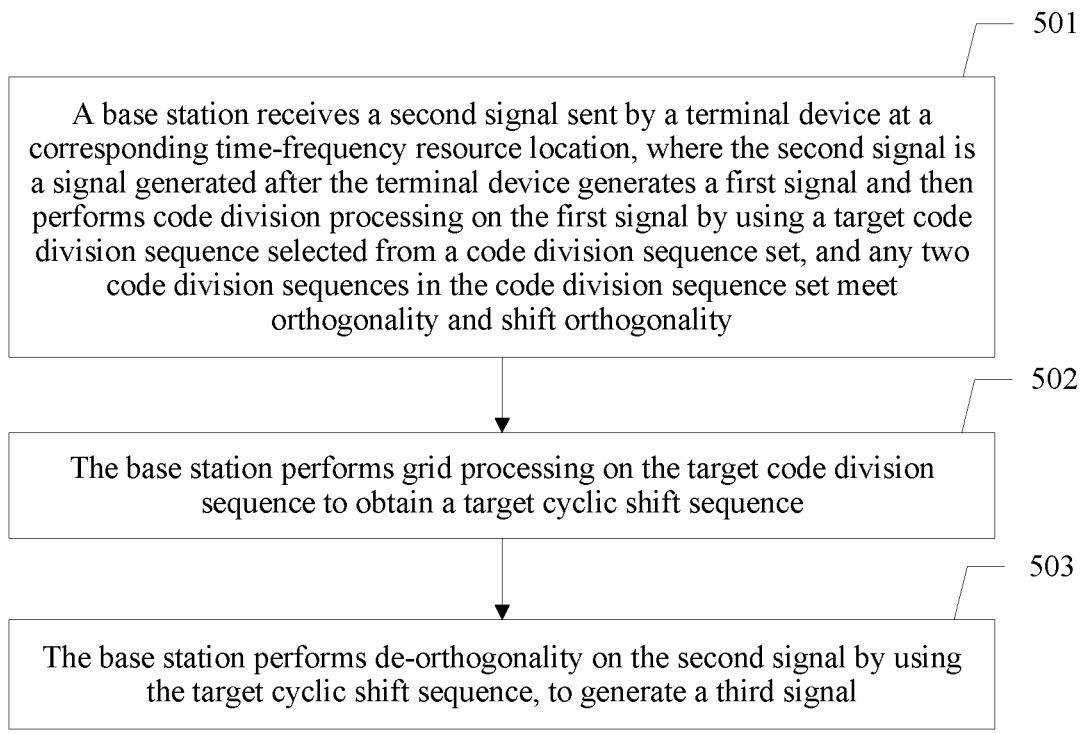
FIG. 7 is a schematic diagram of an embodiment of a signal receiving method according to an embodiment of the present invention.

Referring to FIG. 7, an embodiment of a signal receiving method in an embodiment of the present invention includes the following operations.

Operation 501. A base station receives a second signal sent by a terminal device at a corresponding time-frequency resource location, where the second signal is a signal generated after the terminal device generates a first signal and then performs code division processing on the first signal using a target code division sequence selected from a code division sequence set, and any two code division sequences in the code division sequence set meet orthogonality and shift orthogonality.

In one embodiment, the terminal device generates the first signal, and the terminal device performs code division processing on the first signal using the target code division sequence selected from the code division sequence set, to generate the second signal. Any two code division sequences in the code division sequence set meet orthogonality and shift orthogonality. The terminal device sends the second signal to the base station at the corresponding time-frequency resource location, and the base station receives the second signal.

Operation 502. The base station performs grid processing on the target code division sequence to obtain a target cyclic shift sequence.

In one embodiment, when performing signal detection at the corresponding time-frequency resource location using the target code division sequence, the base station performs grid processing on the target code division sequence to obtain the target cyclic shift sequence.

It should be noted that a propagation latency can be preliminarily estimated using a shift value of the target cyclic shift sequence relative to the target code division sequence. In some embodiments of the present invention, the method further includes:

determining a shift value of the target cyclic shift sequence relative to the target code division sequence; and determining a propagation latency based on the shift value.

Operation 503. The base station performs de-orthogonality on the second signal using the target cyclic shift sequence, to generate a third signal.

In one embodiment, after obtaining the target cyclic shift sequence, the base station performs de-orthogonality on the second signal using the target cyclic shift sequence, to generate the third signal.

It can be understood that in some embodiments the present invention, after the third signal is generated, the propagation latency may be calculated using the third signal.

In one embodiment, the base station performs grid processing on the target code division sequence, so that accuracy of performing de-orthogonality on the second signal is ensured.

For ease of understanding of the grid processing, corresponding description is given in the following using embodiments.

Figure 8:
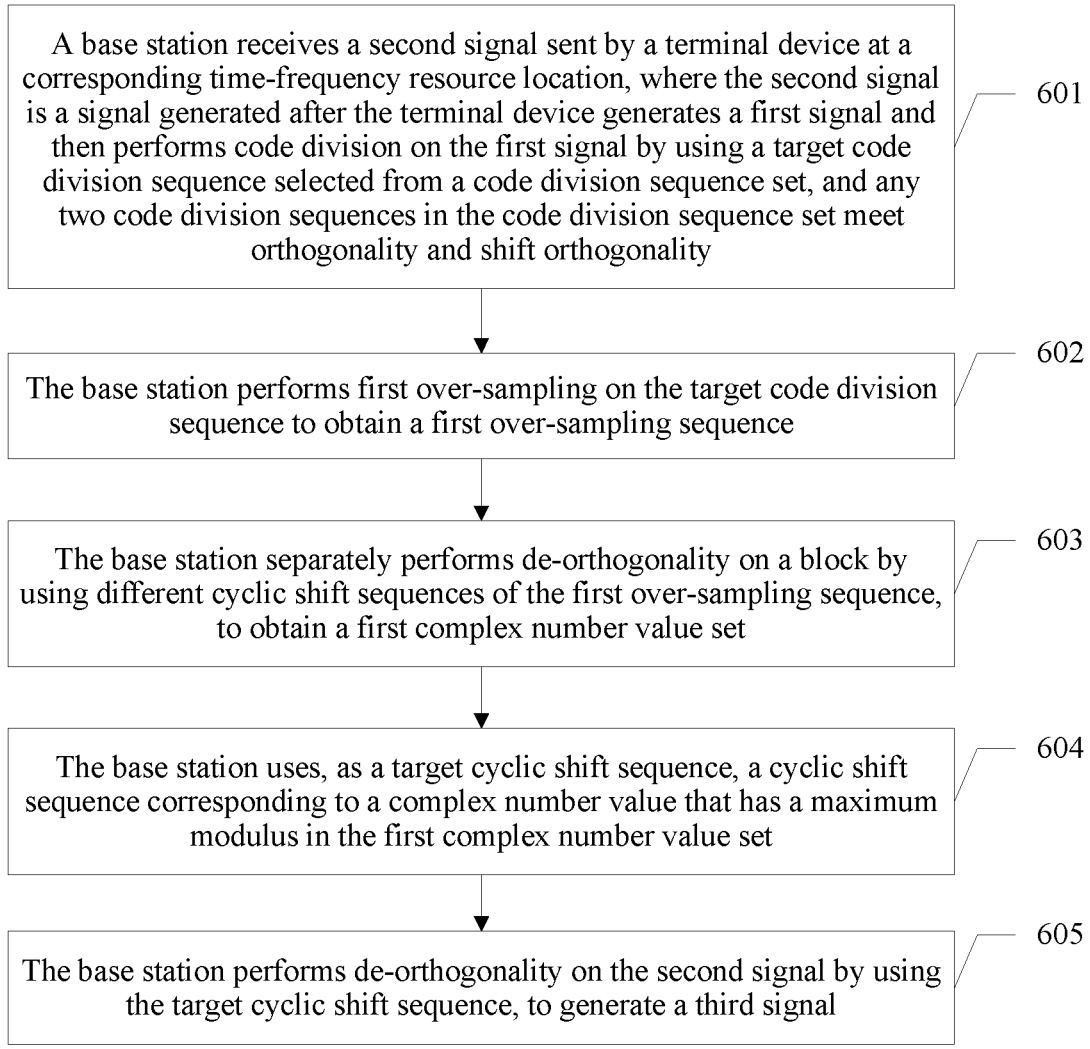
FIG. 8 is a schematic diagram of another embodiment of a signal receiving method according to an embodiment of the present invention.

Referring to FIG. 8, another embodiment of a signal receiving method in an embodiment of the present invention includes the following operations.

Operation 601. A base station receives a second signal sent by a terminal device at a corresponding time-frequency resource location, where the second signal is a signal generated after the terminal device generates a first signal and then performs code division processing on the first signal using a target code division sequence selected from a code division sequence set, and any two code division sequences in the code division sequence set meet orthogonality and shift orthogonality.

In this embodiment, operation 601 is similar to operation 501, and details are not described herein again.

It should be noted that the first signal in this embodiment includes only one block.

Operation 602. The base station performs first over-sampling on the target code division sequence to obtain a first over-sampling sequence.

In this embodiment, assuming that an over-sampling multiple of the second signal is M, and the target code division sequence is $\{a1, a2, a3, a4\}$, after first over-sampling is performed on the target code division sequence, the following is obtained:

$\{a_1, \ldots, a_1, a_2, \ldots, a_2, a_3, \ldots, a_3, a_4, \ldots, a_4\}$, where quantities of all sequence elements are M.

Operation 603. The base station separately performs de-orthogonality on a block using different cyclic shift sequences of the first over-sampling sequence, to obtain a first complex number value set.

In one embodiment, after obtaining the first over-sampling sequence, the base station separately performs de-orthogonality on the block using different cyclic shift sequences of the first over-sampling sequence, and then performs conjugate dot multiplication on a symbol in the block and the first signal, to obtain the first complex number value set by means of combination. If symbols in the block are repeated symbols, the repeated symbols are directly combined. Each cyclic shift sequence is corresponding to one complex number value.

Operation 604. The base station uses, as a target cyclic shift sequence, a cyclic shift sequence corresponding to a complex number value that has a maximum modulus in the first complex number value set.

In one embodiment, the base station determines a complex number value, that has a maximum modulus, from all complex number values in the first complex number value set, and uses, as the target cyclic shift sequence, a cyclic shift sequence corresponding to the complex number value with the maximum modulus. The target cyclic shift sequence is a cyclic shift sequence, of a target code division sequence, that is most suitable to be used to perform de-orthogonality on the second signal.

Operation 605. The base station performs de-orthogonality on the second signal using the target cyclic shift sequence, to generate a third signal.

In one embodiment, after determining the target cyclic shift sequence, the base station performs de-orthogonality on the second signal using the target cyclic shift sequence, to generate the third signal.

It should be noted that the de-orthogonality means performing dot multiplication or conjugate dot multiplication on the second signal and the target cyclic shift sequence. If the terminal device performs dot multiplication during code division processing, the base station correspondingly performs conjugate dot multiplication during de-orthogonality. If the terminal device performs conjugate dot multiplication during code division processing, the base station correspondingly performs dot multiplication during de-orthogonality.

In one embodiment, when the first signal includes only one block, an implementation method for obtaining the target cyclic shift sequence by means of grid processing is provided, so that technical solutions in the present invention are improved.

A prerequisite for the foregoing grid processing is that the first signal includes only one block. The following describes how to obtain the target cyclic shift sequence by means of grid processing when the second signal includes a plurality of blocks.

Figure 9:
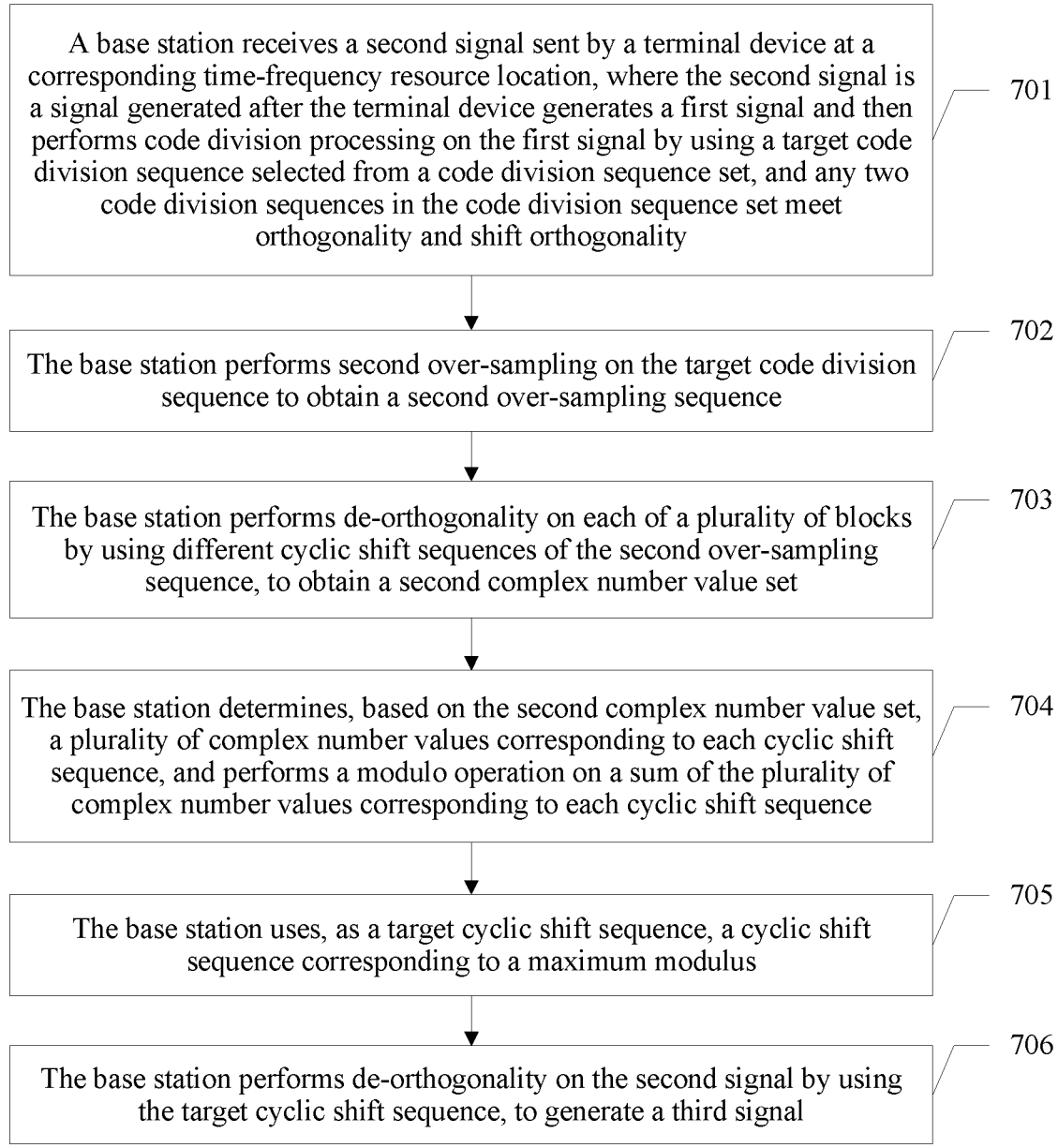
FIG. 9 is a schematic diagram of another embodiment of a signal receiving method according to an embodiment of the present invention.

Referring to FIG. 9, another embodiment of a signal receiving method in an embodiment of the present invention includes the following operations.

Operation 701. A base station receives a second signal sent by a terminal device at a corresponding time-frequency resource location, where the second signal is a signal generated after the terminal device generates a first signal and then performs code division processing on the first signal using a target code division sequence selected from a code division sequence set, and any two code division sequences in the code division sequence set meet orthogonality and shift orthogonality.

In this embodiment, operation 701 is similar to operation 501, and details are not described herein again.

It should be noted that the first signal in this embodiment includes a plurality of blocks.

Operation 702. The base station performs second over-sampling on the target code division sequence to obtain a second over-sampling sequence.

In one embodiment, operation 702 is similar to operation 602, and details are not described herein again.

Operation 703. The base station performs de-orthogonality on each of a plurality of blocks using different cyclic shift sequences of the second over-sampling sequence, to obtain a second complex number value set.

In one embodiment, after obtaining the second over-sampling sequence, the base station performs de-orthogonality on each of the plurality of blocks using different cyclic shift sequences of the second over-sampling sequence, to obtain the second complex number value set.

Operation 704. The base station determines, based on the second complex number value set, a plurality of complex number values corresponding to each cyclic shift sequence, and obtains a sum of modulus values of the plurality of complex number values corresponding to each cyclic shift sequence.

In one embodiment, the second complex number value set includes the plurality of complex number values corresponding to each cyclic shift sequence.

A quantity of the plurality of complex number values corresponding to each cyclic shift sequence is equal to a quantity of blocks in the first signal.

Operation 705. The base station uses, as a target cyclic shift sequence, a cyclic shift sequence corresponding to a maximum modulus.

In one embodiment, the sum of modulus values of the plurality of complex number values corresponding to each cyclic shift sequence is obtained, and a cyclic shift sequence corresponding to a maximum modulus obtained after the sum of the modulus values is obtained is used as the target cyclic shift sequence. This embodiment provides one method for determining the target cyclic shift sequence. In an actual application, the target cyclic shift sequence may be further determined using another method. For example, a modulo operation is performed on each complex number value in the second complex number value set to obtain a complex value with a maximum modulus, and a cyclic shift sequence corresponding to the complex value with the maximum modulus is used as the target cyclic shift sequence. For another example, a plurality of moduli are obtained after a modulo operation is performed on the plurality of complex number values corresponding to each cyclic shift sequence, a quantity of moduli that are in the plurality of moduli corresponding to each cyclic shift sequence and that are greater than a preset threshold is obtained, and a cyclic shift sequence corresponding to a maximum quantity is used as the target cyclic shift sequence. In embodiments of the present invention, the target cyclic shift sequence may be determined using another method, and details are not described herein.

Operation 706. The base station performs de-orthogonality on the second signal using the target cyclic shift sequence, to generate a third signal.

In one embodiment, after determining the target cyclic shift sequence, the base station performs de-orthogonality on the second signal using the target cyclic shift sequence, to generate the third signal.

In one embodiment, when the first signal includes a plurality of blocks, an implementation method for obtaining the target cyclic shift sequence by means of grid processing is provided, so that technical solutions for embodiments in the present invention are improved.

In the foregoing embodiments of the signal receiving method, further, before the base station receives the second signal sent by the terminal device at the corresponding time-frequency resource location, the method includes:

sending indication information to the terminal device, where the indication information is used to indicate the time-frequency resource location.

Further, the indication information is further used to indicate content of the first signal and/or the code division sequence set.

It should be noted that in the foregoing embodiments on the base station side, when the first signal includes at least two blocks, after the third signal is obtained, when it is ensured that two blocks in the third signal have different frequency resources, the propagation latency may be calculated based on a phase difference between the two blocks in the third signal. The frequency resources include a subcarrier, a carrier, and a channel. If the first signal includes only one block, the propagation latency may be calculated based on relevancy of the target code division sequence.

Figure 10:
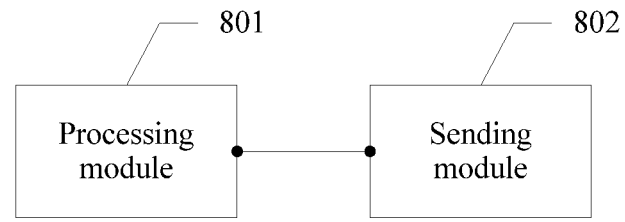
FIG. 10 is a schematic diagram of an embodiment of a terminal device according to an embodiment of the present invention.

The following describes the terminal device in the embodiments of the present invention. Referring to FIG. 10, an embodiment of a terminal device in an embodiment of the present invention includes:

a processing module 801, configured to: generate a first signal, and perform code division processing on the first signal using a target code division sequence selected from a code division sequence set, to generate a second signal, where any two code division sequences in the code division sequence set meet orthogonality and shift orthogonality; and a sending module 802, configured to send the second signal to a base station at a corresponding time-frequency resource location.

In one embodiment, because any two code division sequences in the code division sequence set meet orthogonality, first signals of different terminal devices can multiplex different code channels, and it is ensured that the first signal has a sufficiently large capacity. In addition, to overcome impact exerted by a propagation latency on the orthogonality of the code division sequence set, any two code division sequences in the code division sequence set further need to meet shift orthogonality. In addition, the time-frequency resource location in the present invention may be preset, or may be obtained from an indication of the base station, so that the first signal occupies a few subcarriers or even one subcarrier in a frequency domain. In this way, a PAPR value is excessively high is avoided. Note that power consumption of the terminal device is lower when a PAPR is low. Therefore, in embodiments of the present invention, it can be ensured that the first signal has a sufficiently large capacity when a PAPR is low, and the power consumption of the terminal device is reduced.

Optionally, in some embodiments of the present invention, the processing module 801 is configured to: when the first signal includes at least one block, each block includes a cyclic prefix CP, and the CP has a length of a positive integer quantity of symbols, perform code division processing on each block of the first signal using the target code division sequence selected from the code division sequence set, to generate the second signal.

Optionally, in some embodiments of the present invention, the processing module 801 is configured to: perform, on a per symbol basis, dot multiplication or conjugate dot multiplication on a part other than the CP in each block of the first signal and the target code division sequence, and perform same processing on the CP in each block of the first signal as a symbol corresponding to the CP, to generate the second signal. The target code division sequence is a code division sequence selected from the code division sequence set.

Optionally, in some embodiments of the present invention, the processing module 801 is configured to: when the first signal includes at least two blocks, perform, on a per block basis, dot multiplication or conjugate dot multiplication on the at least two blocks and the target code division sequence, to generate the second signal. The target code division sequence is selected by the terminal from the code division sequence set.

Optionally, in some embodiments of the present invention, the processing module 801 is configured to: when the first signal includes at least two blocks, each block includes a cyclic prefix CP, and the CP has a length of a positive integer quantity of symbols, perform, on a per symbol basis, dot multiplication or conjugate dot multiplication on a part other than the CP in each block of the first signal and a first target code division sequence; perform, on a per block basis, dot multiplication or conjugate dot multiplication on the at least two blocks and a second target code division sequence; and perform same processing on the CP in each block of the first signal as a symbol corresponding to the CP, to generate the second signal. The first target code division sequence is selected by the terminal device from a first code division sequence set, the second target code division sequence is selected by the terminal device from a second code division sequence set, any two code division sequences in the first code division sequence set meet orthogonality and shift orthogonality, and any two code division sequences in the second code division sequence set meet orthogonality and shift orthogonality.

Optionally, in some embodiments of the present invention, a code division sequence $w^u$ in the code division sequence set is generated according to the following formula:

$$w^u = \{w_k^u\}_{k=0}^{L-1} : w_k^u = e^{j2\pi uk/L}, \text{ where}$$

a value range of k is 0 to L−1, a value range of u is 0 to L−1, and L represents a length of the code division sequence.

Optionally, in some embodiment of the present invention, the processing module 801 is configured to perform code division processing on the first signal using a target code division sequence selected from a code division sequence set pre-stored in the terminal device, to generate the second signal.

Figure 11:
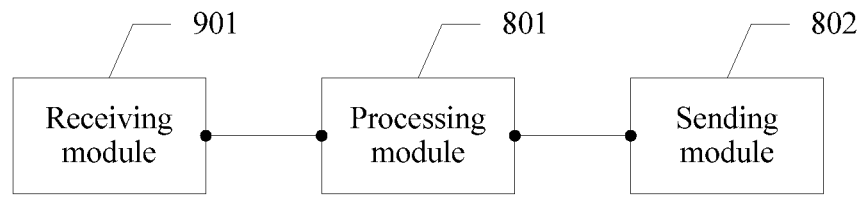
FIG. 11 is a schematic diagram of another embodiment of a terminal device according to an embodiment of the present invention.

Referring to FIG. 11, in some embodiments of the present invention, before the processing module 801 generates the first signal, the terminal device further includes:

a receiving module 901, configured to receive indication information sent by the base station, where the indication information is used to indicate the time-frequency resource location.

Optionally, in some embodiments of the present invention, the indication information is further used to indicate content of the first signal and/or the code division sequence set.

Figure 12:
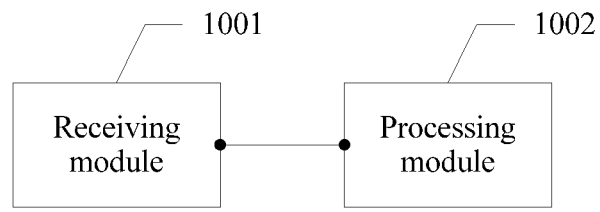
FIG. 12 is a schematic diagram of an embodiment of a base station according to an embodiment of the present invention.

The following describes the base station in the embodiments of the present invention. Referring to FIG. 12, an embodiment of a base station includes:

a receiving module 1001, configured to receive a second signal sent by a terminal device at a corresponding time-frequency resource location, where the second signal is a signal generated after the terminal device generates a first signal and then performs code division processing on the first signal using a target code division sequence selected from a code division sequence set, and any two code division sequences in the code division sequence set meet orthogonality and shift orthogonality; and a processing module 1002, configured to: perform grid processing on the target code division sequence to obtain a target cyclic shift sequence, and perform de-orthogonality on the second signal using the target cyclic shift sequence, to generate a third signal.

In one embodiment, the base station performs grid processing on the target code division sequence, so that accuracy of performing de-orthogonality on the second signal is ensured.

Optionally, in some embodiments of the present invention, the processing module 1002 is configured to: if the first signal includes only one block, perform first over-sampling on the target code division sequence to obtain a first over-sampling sequence; separately perform de-orthogonality on the block using different cyclic shift sequences of the first over-sampling sequence, to obtain a first complex number value set; and use, as the target cyclic shift sequence, a cyclic shift sequence corresponding to a complex number value that has a maximum modulus in the first complex number value set.

Optionally, in some embodiments of the present invention, the processing module 1002 is configured to: if the first signal includes a plurality of blocks, perform second over-sampling on the target code division sequence to obtain a second over-sampling sequence; perform de-orthogonality on each of the plurality of blocks using different cyclic shift sequences of the second over-sampling sequence, to obtain a second complex number value set; determine, based on the second complex number value set, a plurality of complex number values corresponding to each cyclic shift sequence, and obtain a sum of modulus values of the plurality of complex number values corresponding to each cyclic shift sequence; and use, as the target cyclic shift sequence, a cyclic shift sequence corresponding to a maximum modulus.

Optionally, in some embodiments of the present invention, the processing module 1002 is further configured to: determine a shift value of the target cyclic shift sequence relative to the target code division sequence, and determine a propagation latency based on the shift value.

Figure 13:
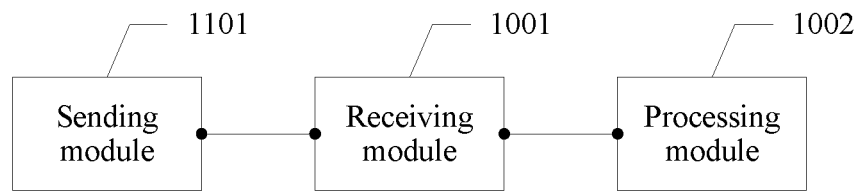
FIG. 13 is a schematic diagram of another embodiment of a base station according to an embodiment of the present invention.

Referring to FIG. 13, in some embodiments of the present invention, before the receiving module 1001 receives the second signal sent by the terminal device at the corresponding time-frequency resource location, the base station further includes:

a sending module 1101, configured to send indication information to the terminal device, where the indication information is used to indicate the time-frequency resource location.

In some embodiments of the present invention, the indication information is further used to indicate content of the first signal and/or the code division sequence set.

Figure 14:
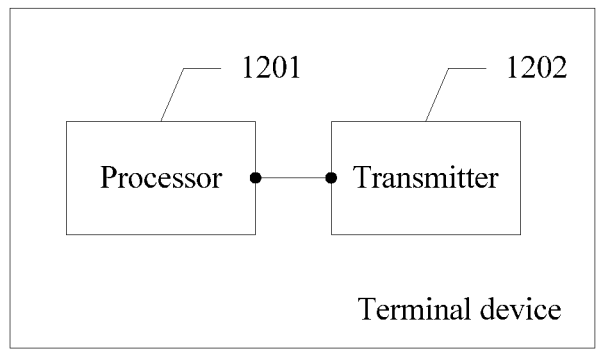
FIG. 14 is a schematic diagram of another embodiment of a terminal device according to an embodiment of the present invention.

Referring to FIG. 14, an embodiment of a terminal device includes:

a processor 1201 and a transmitter 1202.

The processor 1201 is configured to: generate a first signal; perform code division processing on the first signal using a target code division sequence selected from a code division sequence set, to generate a second signal, where any two code division sequences in the code division sequence set meet orthogonality and shift orthogonality; and send the second signal to a base station at a corresponding time-frequency resource location.

In one embodiment, because any two code division sequences in the code division sequence set meet orthogonality, first signals of different terminal devices can multiplex different code channels, and it is ensured that the first signal has a sufficiently large capacity. In addition, to overcome impact exerted by a propagation latency on the orthogonality of the code division sequence set, any two code division sequences in the code division sequence set further need to meet shift orthogonality. In addition, the time-frequency resource location in the present invention may be preset, or may be obtained from an indication of the base station, so that the first signal occupies a few subcarriers or even one subcarrier in a frequency domain. In this way, a PAPR value is excessively high is avoided. Note that power consumption of the terminal device is lower when a PAPR is low. Therefore, in embodiments of the present invention, it can be ensured that the first signal has a sufficiently large capacity when a PAPR is low, and the power consumption of the terminal device is reduced.

An embodiment of the present invention further provides an implementation solution for performing code division processing on the first signal using the target code division sequence selected from the code division sequence set. The solution is as follows: The processor 1201 is configured to: when the first signal includes at least one block, each block includes a cyclic prefix CP, and the CP has a length of a positive integer quantity of symbols, perform code division processing on each block of the first signal using the target code division sequence selected from the code division sequence set.

In one embodiment of the present invention, the cyclic prefix is set to deal with an unknown propagation latency, and is denoted as CP. A quantity of symbols in the CP is related to the propagation latency. If the propagation latency is longer, the quantity of symbols in the CP may correspondingly increase. A condition of the increase is that a current guard time is greater than or equal to two times of the propagation latency. The propagation latency is a time consumed when a signal is sent from the terminal device to the base station.

An embodiment of the present invention further provides an implementation solution for performing code division processing on each block of the first signal using the target code division sequence selected from the code division sequence set. The solution is as follows: The processor 1201 is configured to: perform, on a per symbol basis, dot multiplication or conjugate dot multiplication on a part other than the CP in each block of the first signal and the first target code division sequence, where the target code division sequence is a code division sequence selected from the code division sequence set; and perform same processing on the CP in each block of the first signal as a symbol corresponding to the CP.

An embodiment of the present invention further provides another implementation solution for performing code division processing on the first signal using the target code division sequence selected from the code division sequence set. The solution is as follows: The processor 1201 is configured to: when the first signal includes at least two blocks, perform, on a per symbol basis, dot multiplication or conjugate dot multiplication on a part other than a CP in each block of the first signal and a first target code division sequence; perform, on a per block basis, dot multiplication or conjugate dot multiplication on the at least two blocks and a second target code division sequence; and perform same processing on the CP in each block of the first signal as a symbol corresponding to the CP.

In one embodiment of the present invention, the first target code division sequence is selected by the terminal device from a first code division sequence set, the second target code division sequence is selected by the terminal device from a second code division sequence set, any two code division sequences in the first code division sequence set meet orthogonality and shift orthogonality, and any two code division sequences in the second code division sequence set meet orthogonality and shift orthogonality.

An embodiment of the present invention further provides another implementation solution for performing code division processing on the first signal using the target code division sequence selected from the code division sequence set. The solution is as follows: The processor 1201 is configured to: when the first signal includes at least two blocks, perform, on a per block basis, dot multiplication or conjugate dot multiplication on the at least two blocks and the target code division sequence.

In one embodiment of the present invention, the target code division sequence is selected by the terminal from a code division sequence set, and any two code division sequences in the code division sequence set meet orthogonality and shift orthogonality.

Figure 15:
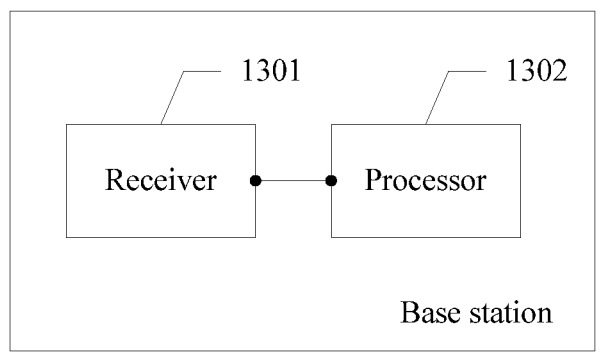
FIG. 15 is a schematic diagram of another embodiment of a base station according to an embodiment of the present invention.

Referring to FIG. 15, an embodiment of a base station includes:

a receiver 1301 and a processor 1302.

The processor 1302 is configured to: receive a second signal sent by a terminal device at a corresponding time-frequency resource location, where the second signal is a signal generated after the terminal device generates a first signal and then performs code division processing on the first signal using a target code division sequence selected from the code division sequence set, and any two code division sequences in the code division sequence set meet orthogonality and shift orthogonality; perform grid processing on the target code division sequence to obtain a target cyclic shift sequence; and perform de-orthogonality on the second signal using the target cyclic shift sequence, to generate a third signal.

In one embodiment, the base station performs grid processing on the target code division sequence, so that accuracy of performing de-orthogonality on the second signal is ensured.

An embodiment of the present invention further provides a implementation solution for performing grid processing on the target code division sequence to obtain the target cyclic shift sequence. The solution is as follows: The processor 1302 is configured to: if the first signal includes only one block, perform first over-sampling on the target code division sequence to obtain a first over-sampling sequence; separately perform de-orthogonality on the block using different cyclic shift sequences of the first over-sampling sequence, to obtain a first complex number value set; and use, as the target cyclic shift sequence, a cyclic shift sequence corresponding to a complex number value that has a maximum modulus in the first complex number value set.

In one embodiment of the present invention, the base station determines a complex number value, that has a maximum modulus, from all complex number values in the first complex number value set, and uses, as the target cyclic shift sequence, a cyclic shift sequence corresponding to the complex number value with the maximum modulus. The target cyclic shift sequence is a cyclic shift sequence, of a target code division sequence, that is most suitable to be used to perform de-orthogonality on the second signal.

An embodiment of the present invention further provides another solution for performing grid processing on the target code division sequence to obtain the target cyclic shift sequence. The solution is as follows: The processor 1302 is configured to: if the first signal includes a plurality of blocks, perform second over-sampling on the target code division sequence to obtain a second over-sampling sequence; perform de-orthogonality on each of the plurality of blocks using different cyclic shift sequences of the second over-sampling sequence, to obtain a second complex number value set; determine, based on the second complex number value set, a plurality of complex number values corresponding to each cyclic shift sequence, and obtain a sum of modulus values of the plurality of complex number values corresponding to each cyclic shift sequence; and use, as the target cyclic shift sequence, a cyclic shift sequence corresponding to a maximum modulus.

In an embodiment of the present invention, the sum of modulus values of the plurality of complex number values corresponding to each cyclic shift sequence is obtained, and a cyclic shift sequence corresponding to a maximum modulus obtained after the sum of the modulus values is obtained is used as the target cyclic shift sequence. This embodiment provides one method for determining the target cyclic shift sequence. In an actual application, the target cyclic shift sequence may be further determined using another method. For example, a modulo operation is performed on each complex number value in the second complex number value set to obtain a complex value with a maximum modulus, and a cyclic shift sequence corresponding to the complex value with the maximum modulus is used as the target cyclic shift sequence. For another example, a plurality of moduli are obtained after a modulo operation is performed on the plurality of complex number values corresponding to each cyclic shift sequence, a quantity of moduli that are in the plurality of moduli corresponding to each cyclic shift sequence and that are greater than a preset threshold is obtained, and a cyclic shift sequence corresponding to a maximum quantity is used as the target cyclic shift sequence. In embodiments of the present invention, the target cyclic shift sequence may be determined using another method, and details are not described herein.

Figure 16:
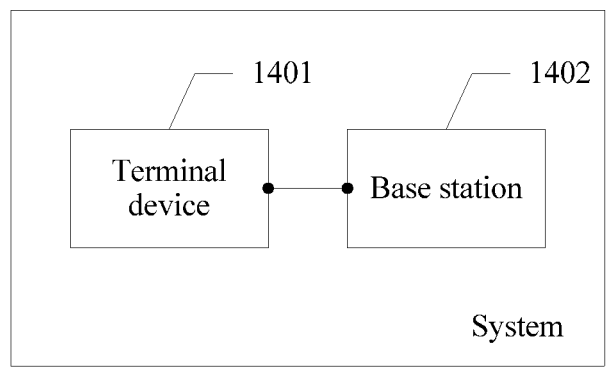
FIG. 16 is a schematic diagram of an embodiment of a system according to an embodiment of the present invention.

Referring to FIG. 16, an embodiment of a system in an embodiment of the present invention includes:

a terminal device 1401 and a base station 1402.

The terminal device 1401 is configured to: generate a first signal; perform code division processing on the first signal using a target code division sequence selected from a code division sequence set, to generate a second signal, where any two code division sequences in the code division sequence set meet orthogonality and shift orthogonality; and send the second signal to the base station 1402 at a corresponding time-frequency resource location.

The base station 1402 is configured to: receive the second signal sent by the terminal device 1401 at the corresponding time-frequency resource location; perform grid processing on the target code division sequence to obtain a target cyclic shift sequence; and perform de-orthogonality on the second signal using the target cyclic shift sequence, to generate a third signal.

In one embodiment, because any two code division sequences in the code division sequence set meet orthogonality, first signals of different terminal devices 1401 can multiplex different code channels, and it is ensured that the first signal has a sufficiently large capacity. In addition, to overcome impact exerted by a propagation latency on the orthogonality of the code division sequence set, any two code division sequences in the code division sequence set further need to meet shift orthogonality. In addition, the time-frequency resource location in the present invention may be preset, or may be obtained from an indication of the base station 1402, so that the first signal occupies a few subcarriers or even one subcarrier in a frequency domain. In this way, a PAPR value that is excessively high is avoided. Note that power consumption of the terminal device 1401 is lower when a PAPR is low. The base station 1402 performs grid processing on the target code division sequence, so that accuracy of performing de-orthogonality on the second signal is ensured.

Optionally, in some embodiments of the present invention, the base station 1402 is further configured to calculate a propagation latency based on the third signal.

Figure 17:
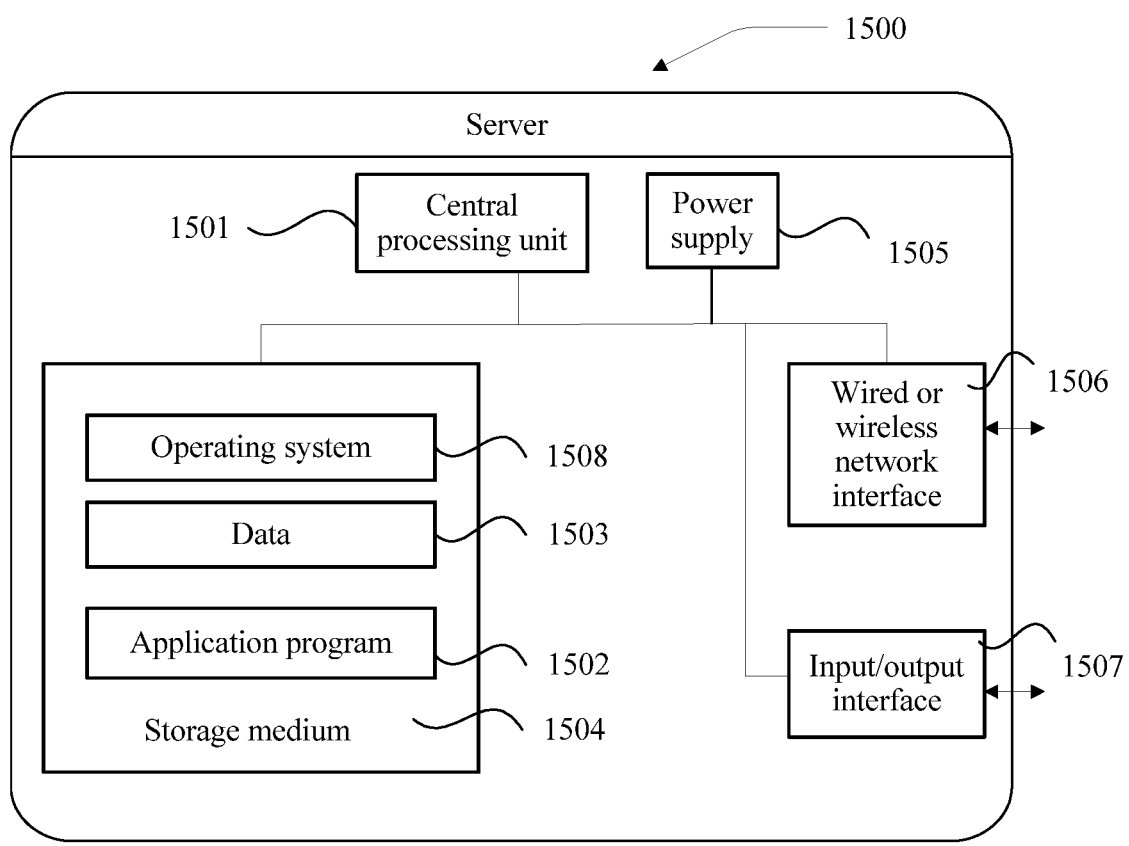
FIG. 17 is a schematic diagram of an embodiment of a server according to an embodiment of the present invention.

An embodiment of the present invention further provides a server. Referring to FIG. 17, an embodiment of a server includes the following content:

FIG. 17 is a schematic structural diagram of the server according to this embodiment of the present invention. The server 1500 may differ greatly due to difference configuration or performance, and may include one or more central processing units (CPU) 1501 (for example, one or more processors), and one or more storage media 1504 (for example, one or more mass storage devices) that store an application program 1502 or data 1503. The storage medium 1504 may be a transient storage or a persistent storage. A program stored in the storage medium 1504 may include one or more modules (not shown in the figure), and each module may include a series of instruction operations to be performed on a switch. Further, the central processing unit 1501 may be configured to communicate with the storage medium 1504 to perform, on the server 1500, a series of instruction operations in the storage medium 1504.

The server 1500 may further include one or more power supplies 1505, one or more wired or wireless network interfaces 1506, one or more input/output interfaces 1507, and/or one or more operating systems 1508, such as Windows Server, Mac OS X, Unix, Linux, or FreeBSD.

It may be clearly understood by persons skilled in the art that, for the purpose of convenient and brief description, for a detailed working process of the foregoing system, apparatus, and unit, refer to a corresponding process in the foregoing embodiments, and details are not described herein again.

In the several embodiments provided in this application, it should be understood that the disclosed system, apparatus, and method may be implemented in other manners. For example, the described apparatus embodiment is only an example. For example, the unit division is only logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions in the present invention may be implemented in a form of a software product. The software product is stored in a storage medium, and includes several instructions for instructing a computer device (which may be a personal computer, a server, a network device, or the like) to perform all or some of the operations of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing embodiments are only intended for describing the technical solutions in the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions in the embodiments of the present invention.

What is claimed is:

1. A signal sending method, comprising:
    generating, by a terminal device, a first signal;
    performing, by the terminal device, code division processing on the first signal using a target code division sequence selected from a code division sequence set, to generate a second signal, wherein any two code division sequences in the code division sequence set meet a condition of orthogonality and shift orthogonality, wherein the code division processing is performed on a portion of the first signal on a per symbol basis; and
    sending, by the terminal device, the second signal to a base station at a corresponding time-frequency resource location.

2. The method according to claim 1, wherein the first signal comprises at least one block, each block comprises a cyclic prefix (CP), and the CP has a length of a positive integer quantity of symbols; and
    the performing, by the terminal device, code division processing on the first signal using a target code division sequence selected from a code division sequence set comprises:
    performing, by the terminal device, code division processing on each block of the first signal using the target code division sequence selected from the code division sequence set.

3. The method according to claim 2, wherein the performing, by the terminal device, code division processing on each block of the first signal using the target code division sequence selected from the code division sequence set comprises:
    performing, by the terminal device on a per symbol basis, dot multiplication or conjugate dot multiplication on a part other than the CP in each block of the first signal and the target code division sequence, wherein the target code division sequence is a code division sequence selected from the code division sequence set; and
    performing, by the terminal device, same processing on the CP in each block of the first signal as a symbol corresponding to the CP.

4. The method according to claim 1, wherein the first signal comprises at least two blocks, and the performing, by the terminal device, code division processing on the first signal using a target code division sequence selected from a code division sequence set comprises:
    performing, by the terminal device on a per block basis, dot multiplication or conjugate dot multiplication on the at least two blocks and the target code division sequence, wherein the target code division sequence is selected by the terminal device from the code division sequence set.

5. The method according to claim 1, wherein the first signal comprises at least two blocks, each block comprises a cyclic prefix CP, and the CP has a length of a positive integer quantity of symbols; and
    the performing, by the terminal device, code division processing on the first signal using a target code division sequence selected from a code division sequence set comprises:
    performing, by the terminal device on a per symbol basis, dot multiplication or conjugate dot multiplication on a part other than the CP in each block of the first signal and a first target code division sequence, and performing, on a per block basis, dot multiplication or conjugate dot multiplication on the at least two blocks and a second target code division sequence, wherein the first target code division sequence is selected by the terminal device from a first code division sequence set, the second target code division sequence is selected by the terminal device from a second code division sequence set, any two code division sequences in the first code division sequence set meet the condition of orthogonality and shift orthogonality, and any two code division sequences in the second code division sequence set meet the condition of orthogonality and shift orthogonality; and performing, by the terminal device, same processing on the CP in each block of the first signal as a symbol corresponding to the CP.

6. A signal receiving method, comprising:
receiving, by a base station, a second signal sent by a terminal device at a corresponding time-frequency resource location, wherein the second signal is a signal generated after the terminal device generates a first signal and then performs code division processing on the first signal using a target code division sequence selected from a code division sequence set, and any two code division sequences in the code division sequence set meet a condition orthogonality and shift orthogonality, wherein the code division processing is performed on a portion of the first signal on a per symbol basis;
performing, by the base station, grid processing on the target code division sequence to obtain a target cyclic shift sequence; and
performing, by the base station, de-orthogonality processing on the second signal using the target cyclic shift sequence, to generate a third signal.

7. The method according to claim 6, wherein if the first signal comprises only one block, the performing, by the base station, grid processing on the target code division sequence to obtain a target cyclic shift sequence comprises:
performing, by the base station, first over-sampling on the target code division sequence to obtain a first over-sampling sequence;
separately performing, by the base station, de-orthogonality on the block using different cyclic shift sequences of the first over-sampling sequence, to obtain a first complex number value set; and
using, by the base station as the target cyclic shift sequence, a cyclic shift sequence corresponding to a complex number value that has a maximum modulus in the first complex number value set.

8. The method according to claim 6, wherein if the first signal comprises a plurality of blocks, the performing, by the base station, grid processing on the target code division sequence to obtain a target cyclic shift sequence comprises:
performing, by the base station, second over-sampling on the target code division sequence to obtain a second over-sampling sequence;
performing, by the base station, de-orthogonality on each of the plurality of blocks using different cyclic shift sequences of the second over-sampling sequence, to obtain a second complex number value set; and
determining, by the base station based on the second complex number value set, a plurality of complex number values corresponding to each cyclic shift sequence, and obtaining a sum of modulus values of the plurality of complex number values corresponding to each cyclic shift sequence; and
using, by the base station as the target cyclic shift sequence, a cyclic shift sequence corresponding to a maximum modulus.

9. The method according to claim 7, wherein the method further comprises:
determining a shift value of the target cyclic shift sequence relative to the target code division sequence; and
determining a propagation latency based on the shift value.

10. The method according to claim 7, wherein before the receiving, by a base station, a second signal sent by a terminal device at a corresponding time-frequency resource location, the method further comprises:
sending indication information to the terminal device, wherein the indication information is used to indicate the time-frequency resource location.

11. The method according to claim 10, wherein the indication information is further used to indicate content of the first signal and/or the code division sequence set.

12. A terminal device, comprising:
a processor, configured to: generate a first signal, and perform code division processing on the first signal using a target code division sequence selected from a code division sequence set, to generate a second signal, wherein any two code division sequences in the code division sequence set meet a condition orthogonality and shift orthogonality, wherein the code division processing is performed on a portion of the first signal on a per symbol basis; and
a transmitter, configured to send the second signal to a base station at a corresponding time-frequency resource location.

13. The terminal device according to claim 12, wherein the processor is configured to: when the first signal comprises at least one block, each block comprises a cyclic prefix (CP), and the CP has a length of a positive integer quantity of symbols, perform code division processing on each block of the first signal using the target code division sequence selected from the code division sequence set, to generate the second signal.

14. The terminal device according to claim 13, wherein the processor is configured to: perform, on a per symbol basis, dot multiplication or conjugate dot multiplication on a part other than the CP in each block of the first signal and the target code division sequence, and perform same processing on the CP in each block of the first signal as a symbol corresponding to the CP to generate the second signal, wherein the target code division sequence is a code division sequence selected from the code division sequence set.

15. The terminal device according to claim 12, wherein the processor is configured to: when the first signal comprises at least two blocks, perform, on a per block basis, dot multiplication or conjugate dot multiplication on the at least two blocks and the target code division sequence, to generate the second signal, wherein the target code division sequence is selected by the terminal device from the code division sequence set.

16. The terminal device according to claim 12, wherein the processor is configured to: when the first signal comprises at least two blocks, each block comprises a cyclic prefix CP, and the CP has a length of a positive integer quantity of symbols, perform, on a per symbol basis, dot multiplication or conjugate dot multiplication on a part other than the CP in each block of the first signal and a first target code division sequence; perform, on a per block basis, dot multiplication or conjugate dot multiplication on the at least two blocks and a second target code division sequence; and perform same processing on the CP in each block of the first signal as a symbol corresponding to the CP to generate the second signal, wherein the first target code division sequence is selected by the terminal device from a first code division sequence set, the second target code division sequence is selected by the terminal device from a second code division sequence set, any two code division sequences in the first code division sequence set meet the condition of orthogonality and shift orthogonality, and any two code division sequences in the second code division sequence set meet the condition of orthogonality and shift orthogonality.

17. A base station, comprising:
a receiver, configured to receive a second signal sent by a terminal device at a corresponding time-frequency resource location, wherein the second signal is a signal generated after the terminal device generates a first signal and then performs code division processing on the first signal using a target code division sequence selected from a code division sequence set, and any two code division sequences in the code division sequence set meet a condition of orthogonality and shift orthogonality, wherein the code division processing is performed on a portion of the first signal on a per symbol basis; and
a processor, configured to: perform grid processing on the target code division sequence to obtain a target cyclic shift sequence, and perform de-orthogonality on the second signal using the target cyclic shift sequence, to generate a third signal.

18. The base station according to claim 17, wherein the processor is configured to: if the first signal comprises only one block, perform first over-sampling on the target code division sequence to obtain a first over-sampling sequence; separately perform de-orthogonality on the block using different cyclic shift sequences of the first over-sampling sequence, to obtain a first complex number value set; and use, as the target cyclic shift sequence, a cyclic shift sequence corresponding to a complex number value that has a maximum modulus in the first complex number value set.

19. The base station according to claim 17, wherein the processor is configured to: if the first signal comprises a plurality of blocks, perform second over-sampling on the target code division sequence to obtain a second over-sampling sequence; perform de-orthogonality on each of the plurality of blocks using different cyclic shift sequences of the second over-sampling sequence, to obtain a second complex number value set; determine, based on the second complex number value set, a plurality of complex number values corresponding to each cyclic shift sequence, and perform a modulo operation on a sum of the plurality of complex number values corresponding to each cyclic shift sequence; and use, as the target cyclic shift sequence, a cyclic shift sequence corresponding to a maximum modulus.

20. The base station according to claim 17, wherein the processor is further configured to: determine a shift value of the target cyclic shift sequence relative to the target code division sequence, and determine a propagation latency based on the shift value.

* * * * *